US 11,458,806 B2

(12) United States Patent
Haupt et al.

(10) Patent No.: US 11,458,806 B2
(45) Date of Patent: Oct. 4, 2022

(54) HVAC INLET WITH RAM AIR AND PARTIAL RECIRCULATION FUNCTION

(71) Applicant: Hanon Systems, Daejeon (KR)

(72) Inventors: Eric Haupt, Livonia, MI (US); Jayanthi Iyer, Northville, MI (US); Dennis Vermette, Westland, MI (US); Shankar Patil, Novi, MI (US)

(73) Assignee: HANON SYSTEMS, Daejeon (KR)

( * ) Notice: Subject to any disclaimer, the term of this patent is extended or adjusted under 35 U.S.C. 154(b) by 255 days.

(21) Appl. No.: 16/847,973

(22) Filed: Apr. 14, 2020

(65) Prior Publication Data
US 2020/0346519 A1    Nov. 5, 2020

Related U.S. Application Data

(60) Provisional application No. 62/842,874, filed on May 3, 2019.

(51) Int. Cl.
*B60H 1/24* (2006.01)
*B60H 1/00* (2006.01)
*B60H 1/26* (2006.01)

(52) U.S. Cl.
CPC ..... *B60H 1/00835* (2013.01); *B60H 1/00764* (2013.01); *B60H 1/26* (2013.01)

(58) Field of Classification Search
CPC ............ B60H 1/00835; B60H 1/00671; B60H 2001/00707; B60H 1/00664; B60H 1/00864; B60H 1/00842; B60H 1/00849; B60H 2001/3471; B60H 1/00857

USPC ................................ 454/143, 152, 155, 158
See application file for complete search history.

(56) References Cited

U.S. PATENT DOCUMENTS

| 5,645,479 | A | * | 7/1997 | Komowski | ........ | B60H 1/00514 454/139 |
| 5,876,277 | A | * | 3/1999 | Uemura | ............. | B60H 1/00849 454/158 |
| 6,386,966 | B1 | | 5/2002 | Kuwayama et al. | | |
| 6,669,548 | B2 | * | 12/2003 | Fujiwara | ............ | B60H 1/00685 165/41 |
| 11,077,737 | B2 | * | 8/2021 | Lee | .................... | B60H 1/00028 |
| 2002/0000254 | A1 | * | 1/2002 | Sato | ................... | B60H 1/00849 137/625.44 |

(Continued)

FOREIGN PATENT DOCUMENTS

| DE | 102005043502 A1 | 3/2007 |
| DE | 112007002543 T5 | 9/2009 |
| DE | 112013004228 T5 | 6/2015 |

*Primary Examiner* — Ko-Wei Lin
(74) *Attorney, Agent, or Firm* — Shumaker, Loop & Kendrick, LLP; James D. Miller

(57) ABSTRACT

An air handling system of a vehicle comprises a housing defining an inlet section. The inlet section includes a recirculation inlet in fluid communication with a passenger compartment of the vehicle and a fresh air inlet in fluid communication with an ambient environment. An air distribution door is disposed in the inlet section for controlling a distribution of air entering the inlet section through the recirculation inlet and the fresh air inlet. A baffle door is disposed in the inlet section for selectively reducing a flow area through the fresh air inlet to accommodate a ram air pressure induced by motion of the vehicle relative to fresh air of the ambient environment.

16 Claims, 15 Drawing Sheets

(56) References Cited

U.S. PATENT DOCUMENTS

| | | | |
|---|---|---|---|
| 2002/0009969 A1* | 1/2002 | Sato | B60H 1/00671 |
| | | | 454/139 |
| 2002/0025772 A1* | 2/2002 | Egami | B60H 1/00849 |
| | | | 454/126 |
| 2004/0093884 A1* | 5/2004 | Seki | B60H 1/00842 |
| | | | 62/244 |
| 2004/0211552 A1* | 10/2004 | Seki | B60H 1/00842 |
| | | | 165/204 |
| 2006/0086495 A1* | 4/2006 | Yelles | B60H 1/00849 |
| | | | 165/271 |
| 2007/0077879 A1* | 4/2007 | Marshall | B60H 1/00842 |
| | | | 454/121 |
| 2014/0194048 A1* | 7/2014 | Wittmann | B60H 1/00028 |
| | | | 454/141 |
| 2015/0017899 A1* | 1/2015 | Kim | B60H 1/00785 |
| | | | 454/75 |
| 2016/0144688 A1* | 5/2016 | Kim | B60H 1/00028 |
| | | | 454/143 |

* cited by examiner

HVAC INLET WITH RAM AIR AND PARTIAL RECIRCULATION FUNCTION

CROSS-REFERENCE TO RELATED APPLICATIONS

This patent application claims priority to U.S. Provisional Patent Application Ser. No. 62/842,874, filed on May 3, 2019, the entire disclosure of which is hereby incorporated herein by reference.

FIELD OF THE INVENTION

The present invention relates to a heating, ventilating, and air conditioning (HVAC) system for a motor vehicle, and more specifically, to an inlet section of an air handling system of the HVAC system, wherein the inlet section includes a baffle feature for preventing an undesired flow of fresh air into the passenger compartment of the vehicle in reaction to an increasing speed of the motor vehicle generating an increasing ram air pressure within the inlet section of the air handling system.

BACKGROUND OF THE INVENTION

The introduction of electric and hybrid electric vehicles has resulted in the need for energy conservation and/or reuse with respect to various different systems of the associated vehicles. With regards to the HVAC system of such vehicles, it may be necessary to reuse the previously conditioned air present within the passenger compartment in order to improve the efficiency of the HVAC system. This occurs because the air is typically already in a heated or cooled state in comparison to the ambient environment, hence the HVAC system requires a decreased heating or cooling capacity when conditioning the recirculated air originating from the passenger compartment. However, the sole use of recirculated air originating from the passenger compartment can introduce undesirable fogging on the vehicle windows with respect to various operational modes of the HVAC system. This occurs because each breath taken in by the passengers of the vehicle adds moisture to the air being recirculated within the passenger compartment.

In order to prevent such occurrences, it may be desirable to introduce fresh air to the HVAC system in addition to or in place of the recirculated air. The use of a combination of a partial flow of fresh air and a partial flow of recirculated air accordingly reduces the risk of fogging of the vehicle windows, which in turn improves the vehicle operating safety.

Such HVAC systems include an air handling housing that defines a flow path for the air to flow through when being conditioned and then distributed to the passenger compartment through various vents. The air handling housing typically includes an air inlet section where air first enters the air handling housing before being distributed to a conditioning section of the air handling housing. The air inlet section includes at least a fresh air inlet and a recirculated air inlet that can each be used to introduce the air into the conditioning section, wherein at least one air distribution door controls the distribution of the air entering from the fresh air inlet and the recirculated air inlet. For example, the air distribution door may be adjustable between a first position wherein the fresh air inlet is completely open while the recirculated air inlet is completely closed, a second position wherein the fresh air inlet is completely closed while the recirculated air inlet is completely open, and a plurality of intermediate positions wherein the air distribution door adjustably controls a distribution of the air originating from the fresh air inlet and the recirculated air inlet. The fresh air inlet and the recirculated air inlet typically each lead to an air filter and a downstream blower assembly, wherein a suction pressure generated by the blower assembly causes the air entering the air inlet section to flow in a direction through the air filter and towards a blower wheel of the blower assembly. The air then exits the blower assembly and flows towards the conditioning section of the air handling housing where the air is conditioned and distributed to the various vents of the vehicle based on a passenger selected mode of operation of the HVAC system.

Many conventional air handling housings include only a single air distribution door at the air inlet section. Such a single door configuration can disadvantageously cause an unintended and undesirable condition when attempting to introduce a combination of fresh and recirculated air into the conditioning section of the air handling housing through the air inlet section. The manner in which the single air distribution door allows for an open flow path to be provided between the fresh air inlet and the recirculated air inlet when the air distribution door is in one of the intermediate positions can under some circumstances lead to a situation wherein the fresh air entering the fresh air inlet flows back through the recirculated air inlet and into the passenger compartment of the vehicle. This can occur during operation of the vehicle due to the generation of an increasing ram air pressure in the fresh air introduced to the air inlet section as a result of the increasing velocity of the vehicle relative to the ambient air. As the ram air pressure increases, the likelihood of the fresh air reaching a pressure sufficient for causing the fresh air to flow through the recirculated air inlet and towards the passenger compartment instead of towards the associated blower assembly similarly increases.

The introduction of the fresh air into the passenger compartment via the recirculated air inlet decreases the efficiency of the HVAC system by introducing unconditioned air into the passenger compartment that must in turn be conditioned further when returned to the HVAC system via the recirculation air inlet, which increases the thermal load placed on the HVAC system when attempting to achieve the desired conditioning of the air being delivered to the passenger compartment. This increase in thermal load increases the amount of energy that must be expended to condition the air to in accordance with the requirements of the passenger of the vehicle. Such backflow of the unconditioned fresh air into the passenger compartment also decreases the ability of the HVAC system to regulate the temperature and humidity of the air within the passenger compartment, thereby negatively affecting the comfort of the passenger.

For each of the foregoing reasons, it would be desirable to provide an improved air inlet section of an air handling housing capable of regulating the air flow between the fresh air inlet and the recirculated air inlet as a result of an increasing ram air pressure experienced by the fresh air introduced into the fresh air inlet.

SUMMARY OF THE INVENTION

Compatible and attuned with the present invention, an improved air inlet section of an air handling housing of an HVAC system has been surprisingly discovered.

In one embodiment of the invention, an air handling system of a vehicle is disclosed. The air handling system includes a housing defining an inlet section. The inlet section includes a first recirculation inlet configured to receive recirculated air originating from a passenger compartment of the vehicle and a fresh air inlet configured to receive fresh air originating from an ambient environment. A first air distribution door is disposed in the inlet section and is configured to control a distribution of the recirculated air and the fresh air entering the inlet section through the first recirculation inlet and the fresh air inlet. A baffle door is disposed in the inlet section and is configured to selectively reduce a flow area through the fresh air inlet to accommodate a ram air pressure induced by motion of the vehicle relative to the fresh air of the ambient environment.

A method of operating an air handling system is also disclosed according to an embodiment of the present invention. The method includes the steps of: providing a housing, an air distribution door, and a baffle door, the housing defining an inlet section, the inlet section including a recirculation inlet configured to receive recirculated air originating from a passenger compartment of the vehicle and a fresh air inlet configured to receive fresh air originating from an ambient environment, the air distribution door disposed in the inlet section and configured to control a distribution of the recirculated air and the fresh air entering the inlet section through the recirculation inlet and the fresh air inlet, the baffle door disposed in the inlet section; and adjusting a position of the baffle door to selectively reduce a flow area through the fresh air inlet to accommodate a ram air pressure induced by motion of the vehicle relative to the fresh air of the ambient environment.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

Figure 1:
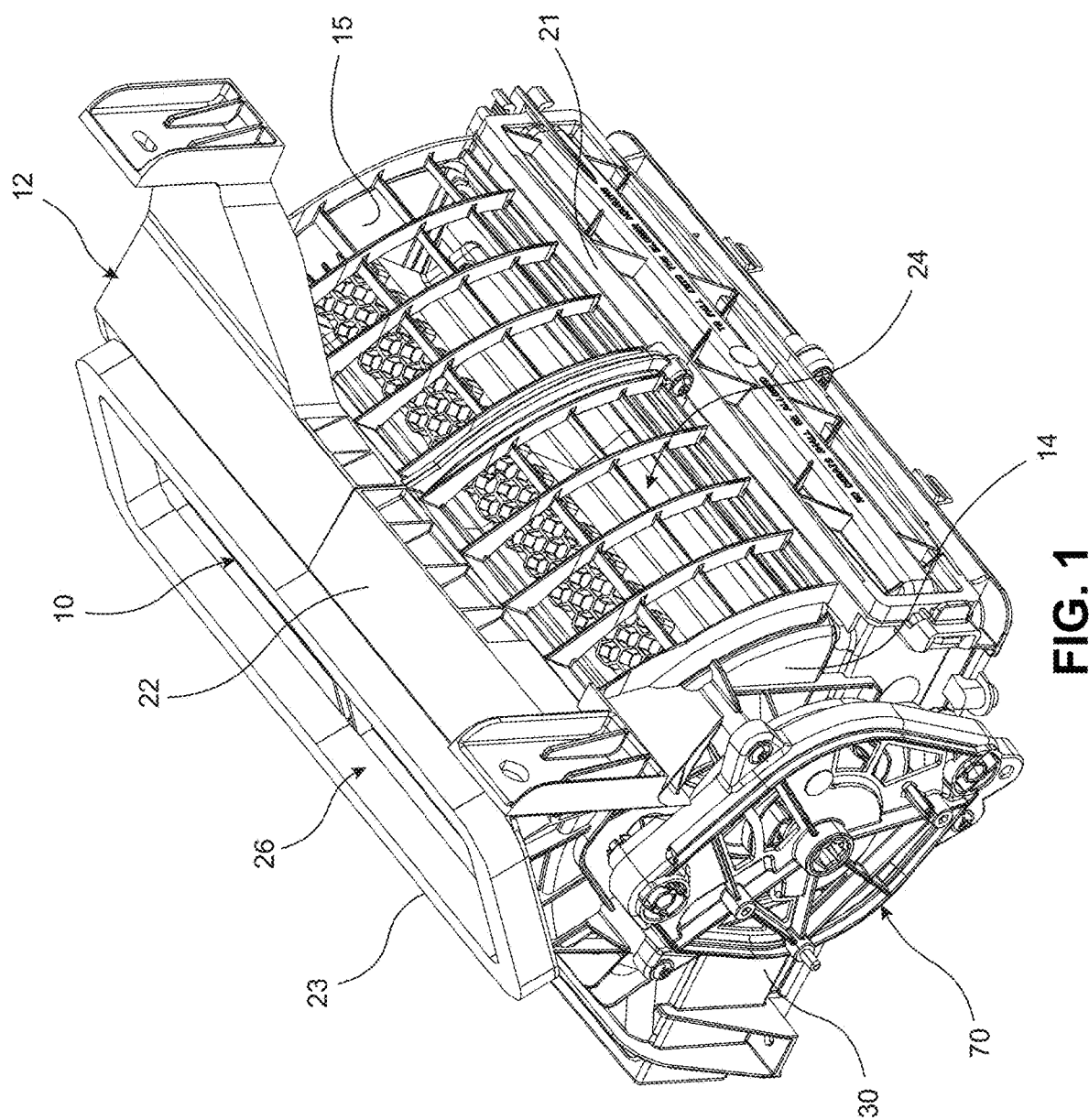
FIG. 1 is a perspective view of an inlet section of a housing of an air handling system for a vehicle according to an embodiment of the present invention.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-9 illustrate an air handling system and the associated components thereof according to one embodiment of the present invention. The air handling system forms a portion of an HVAC system of a vehicle, which may be an electric or hybrid electric vehicle. However, the air handling systems disclosed herein may be utilized in any type of vehicle including a vehicle utilizing an internal combustion engine without departing the scope of the present invention.

The air handling system includes a housing 12 defining a flow path for air to pass through when being conditioned for distribution to a passenger compartment of the associated vehicle. The housing 12 includes an inlet section 10 wherein air is first introduced into the housing 12. The housing 12 further defines a conditioning section (not shown) disposed downstream of the inlet section 10 for heating or cooling the air, a mixing section (not shown) disposed downstream of the conditioning section for mixing the heated or cooled air, and a distribution section (not shown) disposed downstream of the mixing section where the air is distributed to flow paths leading to vents directed toward the passenger compartment of the vehicle.

The housing 12 generally includes a first sidewall 14 and an oppositely arranged second sidewall 15 cooperating to delimit a flow of the air through the housing 12 with respect to a lateral direction of the housing 12, wherein the lateral direction of the housing 12 is generally arranged perpendicular to the various different flow directions of the air associated with the entry of the air into the inlet section 10 of the housing 12. The housing 12 further includes a first wall segment 21, a second wall segment 22, and a third wall segment 23, each of which extends in the lateral direction of the housing 12 between the first sidewall 14 and the second sidewall 15. The first sidewall 14, the second sidewall 15, and any two of the adjacent arranged wall segments 21, 22, 23 accordingly cooperate to form an open cross-sectional shape for directing the flow of the air through the housing 12 as described hereinafter.

A recirculation inlet 24 of the inlet section 10 is formed between the first wall segment 21 and the second wall segment 22 while bounded by the opposing laterally arranged sidewalls 14, 15. The recirculation inlet 24 is in fluid communication with the passenger compartment of the vehicle and is configured to provide a flow path for previously conditioned air to return to the housing 12 for additional heating or cooling within the conditioning section of the housing 12. A suitable conduit or the like (not shown) may be utilized to fluidly couple the passenger compartment to the recirculation inlet 24, as desired.

A fresh air inlet 26 of the inlet section 10 is formed between the second wall segment 22 and the third wall segment 23 while bounded by the opposing laterally arranged sidewalls 14, 15. The fresh air inlet 26 is in fluid communication with the ambient environment surrounding the vehicle and is configured to provide a flow path for fresh ambient air to be first introduced into the housing 12 for heating or cooling within the conditioning section of the housing 12. An air cowl or other similar conduit (not shown) may be utilized to fluidly couple the ambient environment to the fresh air inlet 26, as desired.

Referring now to FIGS. 2-5, which illustrate cross-sectional views through the housing 12 taken along a plane arranged perpendicular to the lateral direction thereof, the housing 12 further includes a blower flow path 28 disposed at a position within the inlet section 10 downstream of a portion of the inlet section 10 wherein the air originating from the recirculation inlet 24 is capable of first mixing with the air originating from the fresh air inlet 26, assuming each of the inlets 24, 26 is open to receive a combination of the recirculated air and fresh air. The blower flow path 28 leads to a blower assembly 29 (shown schematically throughout FIGS. 2-5) of the housing 12 configured to generate a suction pressure for drawing the recirculated and fresh air into the inlet section 10. The blower assembly may include a rotary blower wheel (not shown) as is known in the art for generating the pressure difference, as desired. The associated blower wheel may be configured to operate at a plurality of different rotational speeds as established by a selection of a passenger of the vehicle, wherein each of the different rotational speeds is associated with a different flow rate of the air through the remainder of the air handling system at positions downstream of the blower assembly 29.

The blower flow path 28 is formed by the cooperation of an extension of the first wall segment 21, an extension of the opposing third wall segment 23, the first sidewall 14, and the oppositely arranged second sidewall 15. The blower flow path 28 further includes an air filter 30 extending across an entirety of a flow cross-section thereof. The air filter 30 is configured to remove any debris from the air that could otherwise flow through the housing 12 before eventually reaching the passenger compartment of the vehicle. The air filter 30 is configured to allow for the passage of the air therethrough, but is rigid and solid in a manner wherein the air filter 30 can operate as a stopping mechanism or resting surface, as explained in greater detail hereinafter. It should be understood that the passage of air through the air filter 30 may lower the pressure of the air as a result of the flow obstruction provided by the air filter 30 in a manner resisting the back-flow of the air in a direction upstream of the air filter 30 after the air has passed through the air filter 30 while flowing towards the blower assembly 29 with the blower flow path 28.

The inlet section 10 further includes an air distribution door 40 and a baffle door 50 for controlling the flow of the air through each of the recirculation inlet 24 and the fresh air inlet 26. The air distribution door 40 and the baffle door 50 are shown independently of the remainder of the housing 12 in FIGS. 6 and 7 to better illustrate the individual features thereof in comparison to FIGS. 2-5, which illustrate the doors 40, 50 in substantially simplified fashion to more easily illustrate the modes of operation associated with the illustrated air handling system.

The air distribution door 40 includes an axis of rotation 41 spaced from each of the first wall segment 21, the second wall segment 22, and the third wall segment 23. The axis of rotation 41 is also spaced from the adjacent surface of the air filter 30 at a position upstream of the air filter 30 with respect to the flow of the air through the inlet section 30. The axis of rotation 41 may be formed by a rotational shaft, a pair of shaft portions, or any similar rotational structure or structures mounted to each of the opposing sidewalls 14, 15, as desired. The axis of rotation 41 is arranged in the lateral direction of the housing 12 and therefore extends perpendicular to the general flow directions of the air passing through the inlet section 10.

Figure 6:
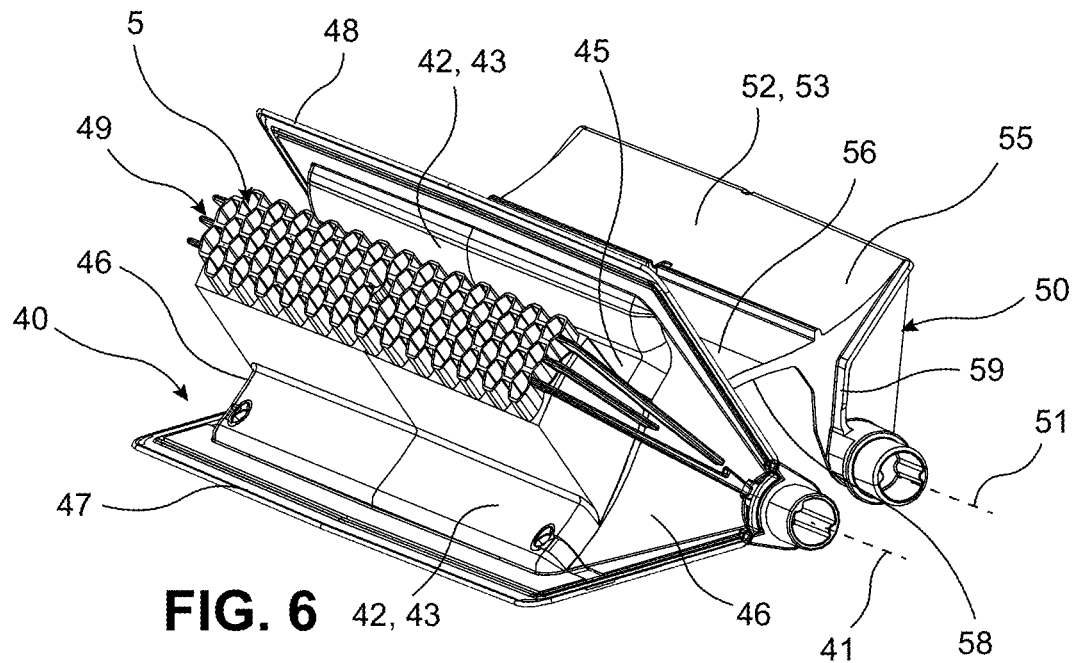
FIGS. 6 and 7 are perspective views of a baffle door and an air distribution door of the air handling system shown in isolation from the remainder of the air handling system.
Figure 7:
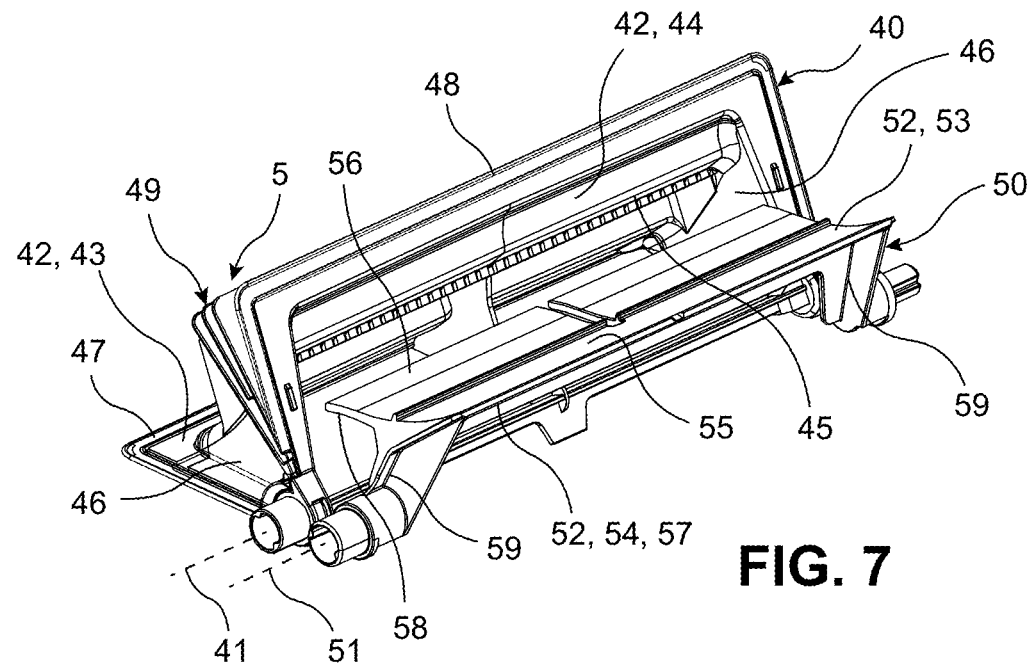

The air distribution door 40 further includes an air directing wall 42 spaced from the axis of rotation 41 and extending in a direction generally tangential to a circle centred on the axis of rotation 41. A pair of lateral connecting walls 46 (FIGS. 6 and 7) are disposed at the lateral ends of the air directing wall 42 adjacent the sidewalls 14, 15 of the housing 12 and extend radially to connect the air directing wall 42 to whatever shaft or shaft portions are used to define the axis of rotation 41 of the air distribution door 40. The air distribution door 40 further includes a first sealing flap 47 and a second sealing flap 48, each of which forms a sealing element for sealing against one of more corresponding surfaces of the housing 12. As best shown in FIGS. 6 and 7, the first sealing flap 47 includes a distal portion arranged parallel to the axis of rotation 41 and a pair of lateral portions extending radially towards the axis of rotation 41. The distal portion of the first sealing flap 47 is disposed adjacent a first end of the air directing wall 42 and is configured to sealingly engage either of the first wall segment 21 or the second wall segment 22 depending on the rotational position of the air distribution door 40. The lateral portions of the first sealing flap 47 are disposed along peripheral portions of the lateral connecting walls 46 and are further configured for engaging corresponding surfaces of the first and second sidewalls 14, 15, wherein each of the corresponding surfaces may be indented laterally inwardly relative to the adjacent portions of the corresponding sidewall 14, 15 to ensure that a seal is established about all three sides of the first sealing slap 47 when the air distribution door 40 is rotated into contact with one of the wall segment 21, 22. The second sealing flap 48 similarly includes a distal portion and two lateral portions extending radially towards the axis of rotation 41. The distal portion of the second sealing flap 48 is disposed adjacent a second end of the air directing wall 42 and is configured for sealingly engaging either of the second wall segment 22 or the third wall segment 23 depending on the rotational position of the air distribution door 40. The lateral portions of the second sealing flap 48 are disposed along peripheral portions of the lateral connecting walls 46 and are configured for engaging corresponding surfaces of the sidewalls 14, 15 for establishing the seal about the periphery of the second sealing flap 48. Each of the sealing flaps 47, 48 may be formed by an elastomeric material configured to flex or otherwise pivot when placed into contact with one of the wall segments 21, 22, 23 or one of the sidewalls 14, 15 to ensure the desired degree of sealing engagement between the sealing flaps 47, 48 and the corresponding surfaces of the housing 12 for preventing the passage of air thereby.

The air directing wall 42 includes an outer surface 43 facing generally away from the axis of rotation 41 and an inner surface 44 facing generally towards the axis of rotation 41. The outer surface 43 may be substantially concave in shape while the inner surface 44 may include a corresponding convex shape. The air directing wall 42 further includes an inwardly indented portion 45 formed adjacent the distal portion of the second sealing flap 48. The indented portion 45 forms an additional concave surface in the outer surface 43 having a relatively smaller radius of curvature than the remainder of the outer surface 43. The indented portion 45 further forms an additional convex surface in the inner surface 44 having a relatively smaller radius of curvature than the remainder of the inner surface 44 that also projects radially inwardly towards the axis of rotation 41.

The air distribution door 40 further includes an air diverter projection 49 extending away from the outer surface 43 of the air directing wall 42. The air diverter projection 49 extends radially outwardly from the air directing wall 42 to a position immediately adjacent a portion of the second wall segment 22 and may extend a desired length in a direction between the opposing ends of the air directing wall 42. The air diverter projection 49 is configured to prevent a flow of air from the fresh air inlet 26 from flowing directly back into the recirculation inlet 24 when the air distribution door 40 is pivoted to an intermediate position allowing for flow from each of the inlets 24, 26. The air diverter projection 49 further includes a sound suppression feature 5 configured to disturb vortex shedding and other velocity based noise, vibration, and harshness (NVH) conditions of any air passing over the sound suppression feature 5, and especially when passing through a relatively small air passageway formed between the sound suppression feature 5 and the second wall segment 22. The sound suppression feature 5 is illustrated as a honeycomb like pattern of radially inwardly extending openings formed within the distal portion of the air diverter projection 49, but any surface feature configured for limiting the generation of NVH past the air diverter projection 49 may be utilized without departing from the scope of the present invention.

As can be seen from the arrows indicating air flow in FIGS. 2-5, air is able to flow to either side of the air directing wall 42 including between the axis of rotation 41 and the inner surface 44 thereof as well as being capable of flowing between the opposing lateral connecting 46 walls. Any additional spokes or similar radially extending elements used to connect the structure defining the axis of rotation 41 to the air directing wall 42 may be similarly provided in a manner wherein the air can readily flow around the spokes or similar elements without significantly altering the flow characteristics of the air when passing through the space formed between the axis of rotation 41 and the air directing wall 42.

The baffle door 50 includes an axis of rotation 51 spaced from each of the first wall segment 21, the second wall segment 22, and the third wall segment 23, with the axis of rotation 51 positioned closer to the third wall segment 23 than the other two wall segments 21, 22, while also being positioned upstream of the adjacent surface of the air filter 30. The axis of rotation 51 of the baffle door 50 is also spaced from the axis of rotation 41 of the air distribution door 40. The axis of rotation 51 may be formed by any suitable shaft, shaft portions, or similar shaft-like structure or structures mounted to the opposing sidewalls 14, 15, as desired. The baffle door 50 further includes a baffle wall 52 spaced at a position from the axis of rotation 51 thereof and arranged to be generally tangential to a circle centred on the axis of rotation 51. The baffle wall 52 includes an outer surface 53 generally facing away from the axis of rotation 51 and an inner surface 54 generally facing towards the axis of rotation 51. The outer surface 53 of the baffle wall 52 includes a concave portion 55 and a convex portion 56, wherein the concave portion 55 is formed adjacent an end of the baffle wall 52 biased towards the third wall segment 23 and the convex portion 56 is formed adjacent an end of the baffle wall 52 biased towards the first wall segment 21. The inner surface 54 of the baffle wall 52 further includes a convex portion 57 corresponding to the concave portion 55 of the outer surface 53 as well as a concave portion 58 corresponding to the convex portion 56 of the outer surface 53. A pair of lateral connecting walls 59 (FIGS. 6 and 7) are disposed at the lateral ends of the baffle wall 52 adjacent and laterally inwardly of the lateral connecting walls 46 of the air distribution door 40 and extend radially inwardly to connect the baffle wall 52 to whatever shaft or shaft portions are used to define the axis of rotation 51 of the air distribution door 50. As can be seen in FIGS. 6 and 7, the baffle door 50 is dimensioned and shaped to be able to nest within the walls 42, 46 of the air distribution door 40 to allow for the baffle door 50 to rotate to positions inside of the air distribution door 40 for achieving each of the modes of operation of the air handling system as shown and described hereinafter. The baffle wall 52 is also spaced from the axis of rotation 51 in a manner wherein air can flow between the axis of rotation 51 and the inner surface 54 of the baffle wall 52 while flowing past any structures that may be used to connect a structure defining the axis of rotation 51 to the baffle wall 52, as desired.

The distribution of air entering the inlet section 10 from the recirculation inlet 24 and the fresh air inlet 26 is controlled using each of the air distribution door 40 and the baffle door 50 based on a mode of operation of the air handling system as selected by a passenger of the vehicle, such as a fresh air setting or a recirculated air setting. In some embodiments, the air handling system may further include a user selectable partial recirculation mode, or alternatively the partial recirculation mode may be automatically selected by a controller (not shown) associated with the air handling system and responsible for actuating the air distribution door 40 and the baffle door 50 in accordance with various conditions experienced by the vehicle, as explained hereinafter.

Figure 2:
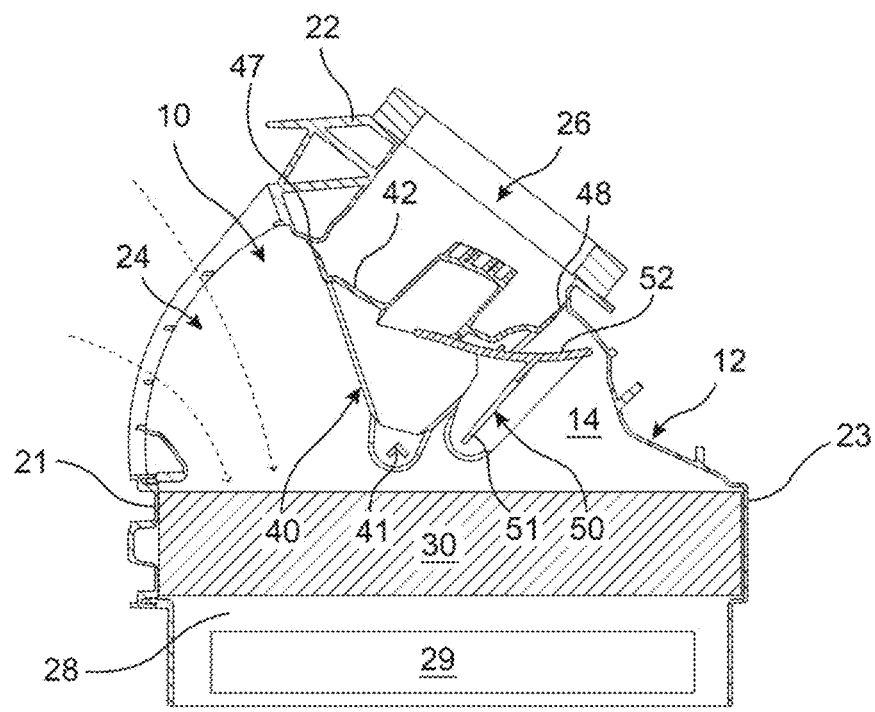
FIG. 2 is a fragmentary cross-sectional elevational view through the inlet section of the housing of FIG. 1, wherein the air handling system is operating in a recirculation mode of operation.

FIG. 2 illustrates a recirculation mode of the air handling system wherein the air distribution door 40 is pivoted to a position wherein the air distribution door 40 closes off the fresh air inlet 26 while completely opening the recirculation inlet 24. The baffle door 50 is pivoted away from the recirculation inlet 24 and towards the third wall segment 23 until the air directing wall 42 and the baffle wall 52 are arranged adjacent each other and substantially in parallel with the baffle door 50 nested within the air distribution door 40. The orientation of the baffle wall 52 of the baffle door 50 allows for the air entering through the recirculation inlet 24 to flow through the inlet section 10 and into the air filter 30 without substantial inference from the baffle door 50, thereby preventing an undesired pressure drop in the air passing through the inlet section 10.

Figure 3:
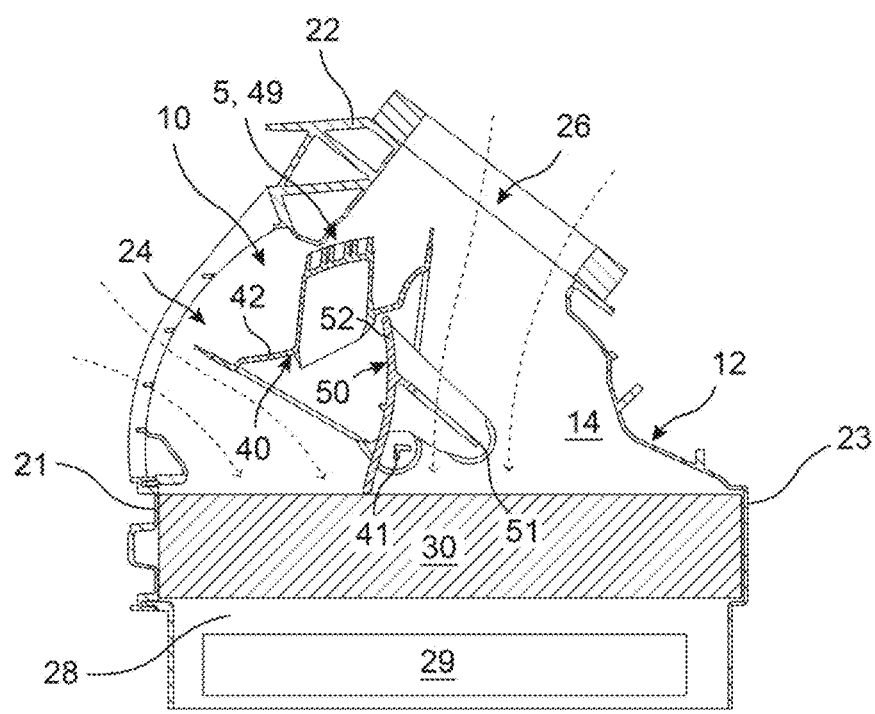
FIG. 3 is a fragmentary cross-sectional elevational view through the inlet section of the housing of FIG. 1, wherein the air handling system is operating in a partial recirculation mode of operation.

FIG. 3 illustrates a partial fresh air and partial recirculated air mode of operation of the air handling system, which may alternatively be referred to as the partial recirculation mode of the air handling system. The air distribution door 40 is pivoted to an intermediate position allowing for air to flow at least partially through each of the recirculation inlet 24 and the fresh air inlet 26. The baffle door 50 is pivoted towards the air distribution door 40 until one end of the baffle wall 52 of the baffle door 50 is disposed adjacent, but spaced from, a portion of the inner surface 44 of the air directing wall 42 while another end of the baffle wall 52 rests against the air filter 30. The baffle wall 52 accordingly blocks the flow of air passing to a fresh air side of the baffle wall 52 from flowing back towards the recirculation inlet 24, thereby preventing an incidence of back-flow of unconditioned air back into the passenger compartment. The air diverter projection 49 of the air distribution door 40 is also disposed immediately adjacent the second wall segment 22 while forming a relatively small gap therebetween without forming a fluid tight seal. The relatively small gap prevents a substantial portion of the air originating from the fresh air inlet 26 passing by the air diverter projection 49 in order to further prevent the incidence of the flow of the fresh air from the fresh air inlet 26 towards the recirculation inlet 24. The sound suppression feature 5 also ensures that any small flow of air passing by the air diverter projection 49 does not generate an undesirable vibration, whistle, or other audible condition that may potentially be heard within the passenger compartment of the vehicle, thereby reducing the NVH associated with the recirculation mode of operation.

The intermediate position of the air distribution door 40 shown in FIG. 3 includes the air diverter projection 49 substantially centred relative to an inwardly projecting portion of the second wall segment 22, but the air distribution door 40 may be rotated to other intermediate positions wherein the air diverter projection 49 is still disposed closely to the second wall segment 22 to prevent the unintended flow of the fresh air towards the recirculation inlet 24. Such minor rotations of the air distribution door 40 from the position illustrated in FIG. 3 further include the end of the baffle wall 52 maintained immediately adjacent the inner surface 44 of the air directing wall 42 to again prevent the flow of the fresh air towards the recirculation inlet 24. The indented portion 45 of the air directing wall 42 may be contoured specifically to ensure that this relationship is maintained along each of the alternative intermediate positions of the air distribution door 40 while allowing for the varying distribution of the air between the recirculation inlet 24 and the fresh air inlet 26.

The alternative intermediate positions of the air distribution door 40 may be required to maintain a substantially equal distribution of the air originating from the recirculation inlet 24 and the fresh air inlet 26 or any other desired distribution of the air originating from each of the inlets 24, 26. For example, as the speed of the vehicle increases, the ram air pressure generated within the fresh air inlet 26 may increase in a manner causing the fresh air to enter the inlet section 10 as a greater flow rate than the air entering the recirculation inlet 24, thereby interrupting the desired equal distribution of the air between the two inlets 24, 26. The air distribution door 40 may accordingly be rotated towards the third wall segment 23 (clockwise from the perspective of FIG. 3) to reduce the cross-section of the flow of the air passing by the air distribution door 40 originating from the fresh air inlet 26 in order to cause a corresponding reduction of the flow of the fresh air into the inlet section 10. In contrast, the air distribution door 40 may be rotated in the opposite direction towards the first wall segment 21 (counter-clockwise) when it may be desired for a greater distribution of the fresh air into the passenger compartment, such as when it is determined that the humidity of the air entering the passenger compartment is greater than desired.

The controller associated with operation of the air distribution door 40 may determine the necessary position of the air distribution door 40 based on a known parameter of the vehicle such as the speed thereof or the amount of humidity contained in the air present within the passenger compartment or entering the inlet section 10 via a corresponding humidity sensor (not shown). The partial recirculation mode of operation may be selected by a passenger of the vehicle or may occur as a feature of the control logic programmed into the associated controller for regulating the flow of the air from the recirculation inlet 24 and the fresh air inlet 26 when either of the recirculation mode or a fresh air mode of operation have been selected by the passenger. The automatic positioning of the air distribution door 40 and the baffle door 50 to the partial recirculation mode or to any of the different potential intermediate positions of the air distribution door 40 with respect to the partial recirculation mode may accordingly be determined to account for the varying ram air pressure experienced within the inlet section 10 or for introducing a desired distribution of fresh air into the inlet section 10 for preventing the formation of fogging or icing on the windows of the associated vehicle.

Figure 4:
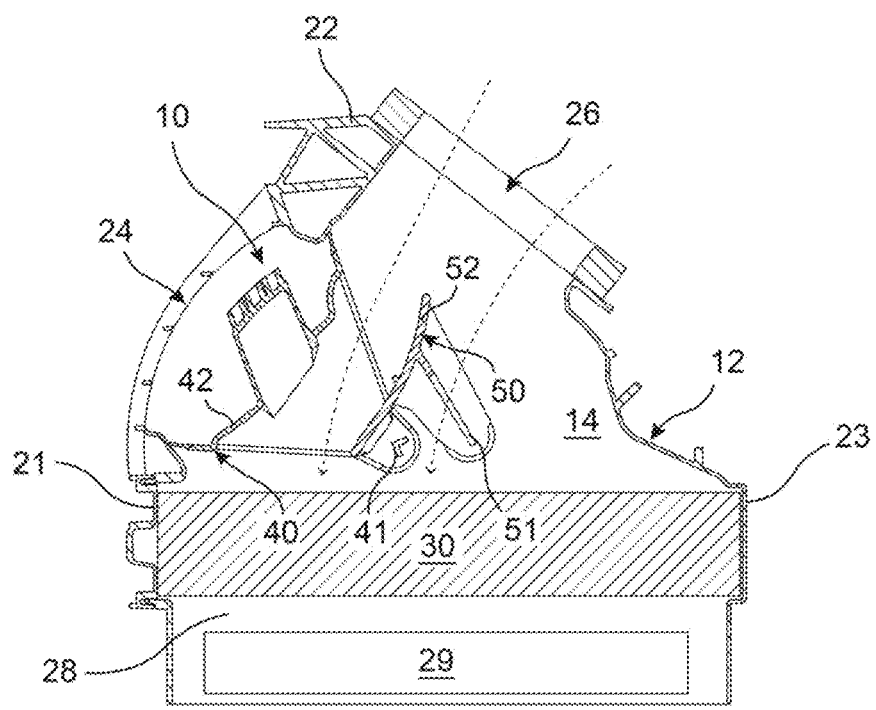
FIG. 4 is a fragmentary cross-sectional elevational view through the inlet section of the housing of FIG. 1, wherein the air handling system is operating in a fresh air mode of operation.

FIG. 4. Illustrates the inlet section 10 when operated in a fresh air mode of operation of the air handling system wherein the air distribution door 40 is pivoted to a position wherein flow through the recirculation inlet 24 is completely blocked while the fresh air inlet 26 is completely opened. The baffle door 50 is pivoted to a position wherein the baffle wall 52 thereof is arranged substantially in parallel to the air directing wall 42 of the air distribution door 40. The position of the baffle door 50 relative to the air distribution door 40 allows for the fresh air to pass through the inlet section 10 without experiencing an undesired pressure drop due to the parallel arrangement of the thin-walled baffle wall 52 and the air directing wall 42.

Figure 5:
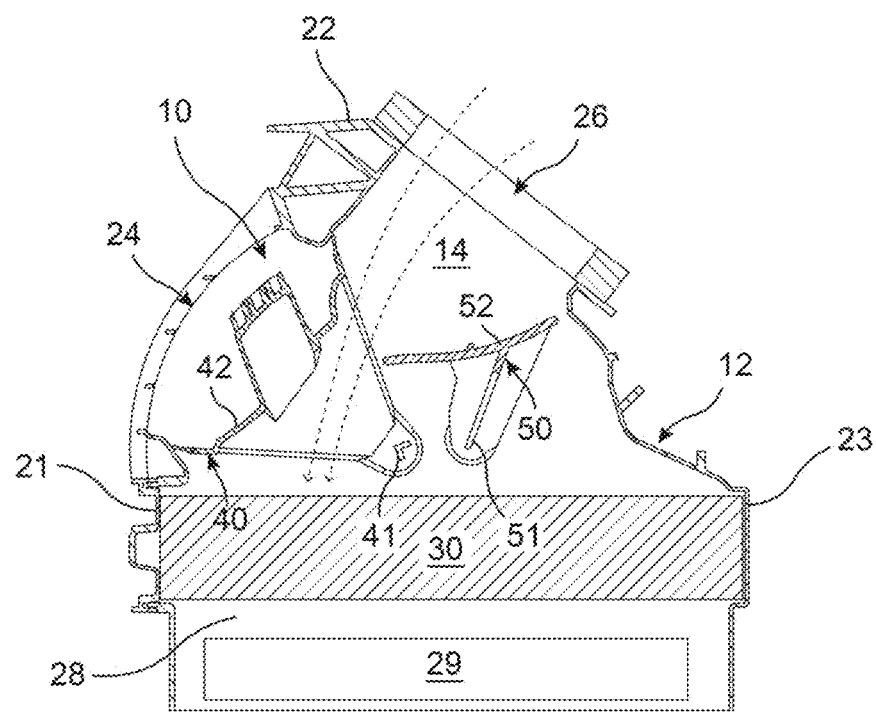
FIG. 5 is a fragmentary cross-sectional elevational view through the inlet section of the housing of FIG. 1, wherein the air handling system is operating in the fresh air mode of operation with a baffle door adjusted to accommodate a ram air pressure of the air passing through a fresh air inlet of the inlet section.

FIG. 5 illustrates a mode of operation of the inlet section 10 wherein the ram air pressure generated by motion of the vehicle is accommodated by restricting the flow area through the fresh air inlet 26 when the fresh air mode of operation is selected by the passenger of the vehicle. The air distribution door 40 is maintained in the position completely closing off the recirculation inlet 24 while the baffle door 50 is pivoted away from the parallel arrangement of FIG. 4 until one end of the baffle wall 52 thereof contacts or is closely spaced from the third wall segment 23 to form a relatively narrow flow path between the air directing wall 42 of the air distribution door 40 and the baffle wall 52 of the baffle door 50. The opening formed between the air directing wall 42 and the baffle wall 52 may be varied depending on the speed of the vehicle and hence the resulting ram air pressure of the air entering through the fresh air inlet 26, wherein the flow opening is reduced as the ram air pressure increases due to an increase in vehicle speed. The manner in which the baffle door 50 includes a reduced lateral dimension in comparison to the air distribution door 40 also allows for a relatively small distribution of the fresh air originating from the fresh air inlet 26 to flow around the lateral sides of the baffle wall 52.

In order to prevent continuous changing of the rotational position of the baffle door 50, the controller associated with the actuation thereof may be pre-programmed to include a finite number of baffle door 50 positions when adjusting for the varying ram air pressures, and these finite positions may be actuated towards in reaction to a signal indicating a speed of the vehicle being within one of a finite number of ranges of speed values (for example, 0-25 mph, 25-50 mph, and greater than 50 mph). The prevention of the continuous actuation of the baffle door 50 may also include the requirement that the speed of the vehicle remain with the desired speed range for a given period of time before readjusting the position of the baffle door 50. The controller may be pre-programmed to include data regarding the desired position of the baffle door 50 relative to the known speed of the vehicle in order to regulate the ram air pressure based on the results of experimentation, as desired.

The degree of constriction of the fresh air inlet 26 via actuation of the baffle door 50 has thus far been described as being dependent on the known vehicle speed, but alternative means may be used to make such a determination. For example, the ambient conditions such as the wind speed encountering the vehicle may render the vehicle speed to be insufficient for properly determining the amount of constriction necessary for establishing a desired dissipation of the ram air pressure generated by motion of the vehicle. In such circumstances, it may alternatively be desirable to make a determination of the pressure of the air when entering the fresh air inlet 26 via an appropriate air pressure sensor or the like, wherein the determined air pressure may then be used as feedback to the associated controller for adjusting the position of the baffle door 50 for constricting the fresh air inlet 26. Alternative means may also be used for determining the adjustment of the baffle door 50 and the air distribution door 40 without necessarily departing from the scope of the present invention, as desired.

Figure 8:
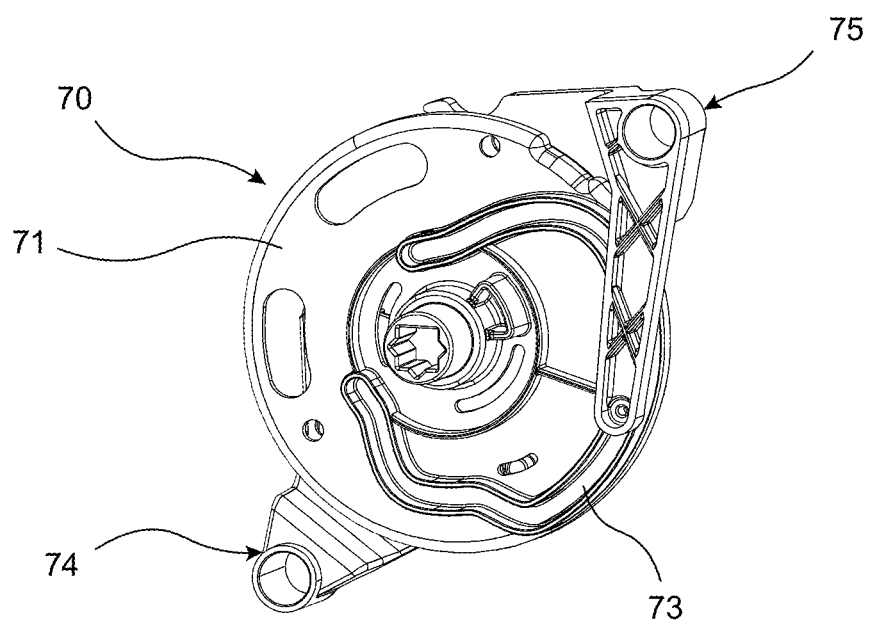
FIGS. 8 and 9 are perspective views of a kinematics system suitable for controlling the positions of the baffle door and the air distribution door of the air handling system in accordance with the modes of operation of the air handling system disclosed in FIGS. 2-5.
Figure 9:
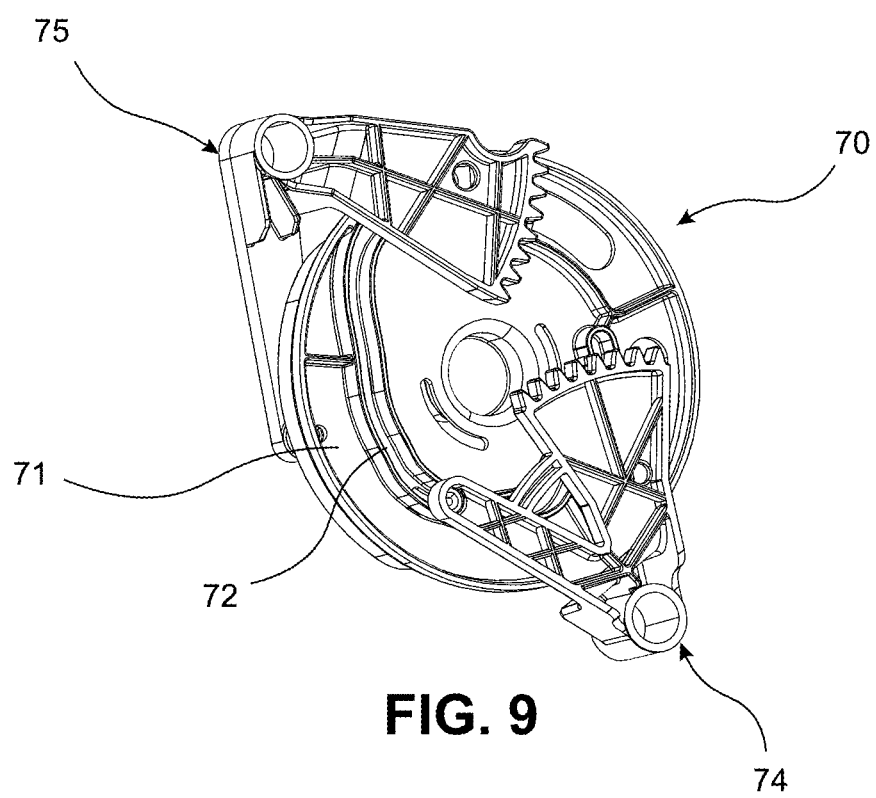

The reduction in the flow cross-section through the fresh air inlet 26 in response to a varying ram air pressure provides for control of the flow rate of the air passing through the remainder of the air handling system during operation of the blower assembly 29. This control of the flow rate of the air prevents situations wherein a passenger of the vehicle continuously is subjected to different air velocities out of the various vents associated with the passenger compartment as a result of factors such as the vehicle speed, thereby maintaining a consistent experience for meeting the comfort demands of the passenger in accordance with the selected mode of operation and air flow rate as chosen by the passenger The air distribution door 40 and the baffle door 50 may be adjusted by a kinematics system 70 having a single actuator in signal communication with the controller as described hereinabove. FIGS. 8 and 9 illustrate one exemplary kinematics system 70 that may be used to simultaneously control the rotational position of each of the doors 40, 50, but it should be understood that a wide variety of kinematics systems may be appropriate for adjusting the doors 40, 50 in the manner described hereinabove. The illustrated kinematics system 70 includes a cam plate 71 rotationally mounted to the housing 12 and including each of a first cam track 72 formed on one side of the cam plate 71 and associated with rotation of the air distribution door 40 and a second cam track 73 formed on an opposing side of the cam plate 71 and associated with rotation of the baffle door 50. A first link 74 rotatably mounted to the housing 12 includes a follower engaging the first cam track 72 while a second link 75 rotatably mounted to the housing 12 includes a follower engaging the second cam track 73. The first link 74 is further operationally engaged with the air distribution door 40 while the second link 75 is further operationally engaged with the baffle door 50. As the cam plate 71 rotates between two different end rotational positions the followers of the links 74, 75 follow the corresponding cam tracks 72, 73 to variably rotate the doors 40, 50 to each of the different configurations shown throughout FIGS. 2-5. Specifically, the recirculation mode illustrated in FIG. 2 is associated with one of the end rotational positions of the cam plate 71 while the ram air compensation mode illustrated in FIG. 5 for maximizing the flow constriction of the fresh air inlet 26 is associated with the other of the end rotational positions of the cam plate 71, wherein the doors 40, 50 are variably adjusted to the illustrated positions as shown in FIGS. 2-5, in that order or a reverse order thereof.

However, alternative methods of rotating the doors 40, 50 may be utilized without necessarily departing from the scope of the present invention. For example, each of the doors 40, 50 may be associated with an independent actuator with each of the actuators activated by the corresponding controller independently. Such a configuration advantageously allows for even more operational modes to be achieved without restricting the position of one of the doors 40, 50 relative to the other of the doors 40, 50 as is the case with a kinematics system 70 such as that disclosed in FIGS. 8 and 9. One skilled in the art should appreciate that alternative control schemes may be utilized while remaining within the scope of the present invention so long as the doors 40, 50 are able to accommodate the varying ram air pressures, humidity readings, or other conditions faced within the inlet section 10 as described hereinabove.

FIGS. 10-14 illustrate an air handling system and the associated components thereof according to another embodiment of the invention. The air handling system includes a housing 112 with an inlet section 110. The inlet section 110 of the housing 112 includes a recirculation inlet 124 formed between a first wall segment 121 and a second wall segment 122 as well as a fresh air inlet 126 formed between the second wall segment 122 and a third wall segment 123. The wall segments 121, 122, 123 extend between opposing sidewalls 114, 115 of the housing 112. An air filter 130 is disposed in a blower flow path 128 disposed downstream of the inlets 124, 126 and upstream of an associated blower assembly 129.

The inlet section 110 further includes an air distribution door 140 and a baffle door 150. The air distribution door 140 include an axis of rotation 141 defined by a suitable shaft, shaft portions, or similar structures, an air directing wall 142, and a pair of lateral connecting walls 146 connecting the air directing wall 142 to the structures defining the axis of rotation 141 at opposing lateral ends of the air directing wall 142 in similar fashion to the air distribution door 40. The air distribution door 140 further includes a first sealing flap 147 formed around a first peripheral portion of the air distribution door 140 including the lateral connecting walls 146 and a first end of the air directing wall 142 and a second sealing flap 148 formed around a second peripheral portion of the air distribution door 140 including the lateral connecting walls 146 and a second end of the air directing wall 142 in similar fashion to the air distribution door 40. However, the air directing wall 142 differs from the air directing wall 42 due to the air directing wall 142 having a substantially constant radius of curvature as measured from the axis of rotation 141 of the air distribution door 140.

Figure 14:
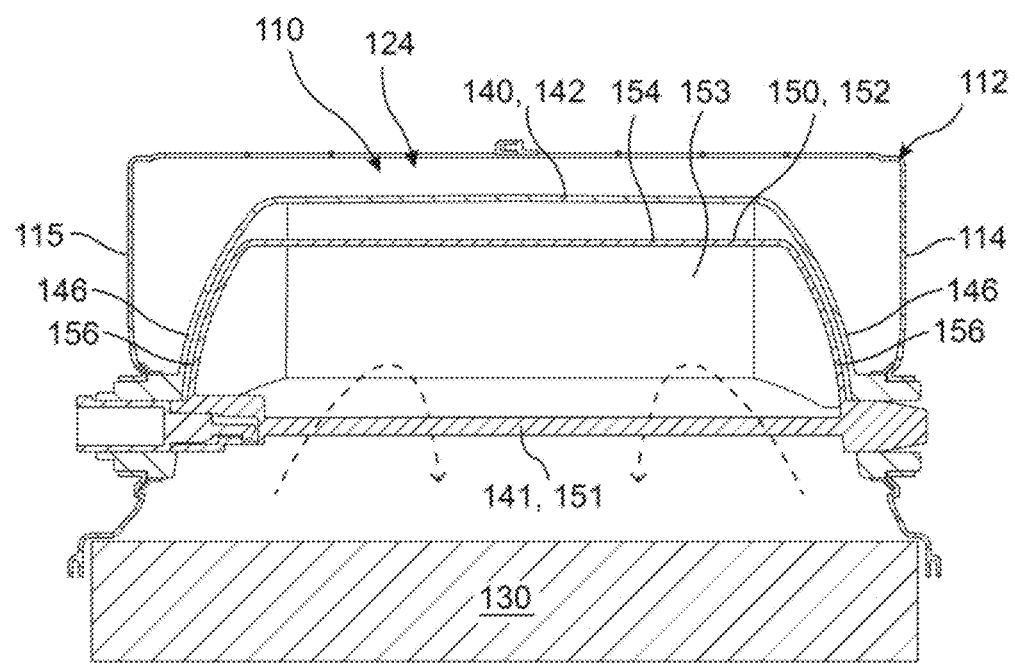
FIG. 14 is a fragmentary cross-sectional elevational view of the inlet section of the housing as taken through section lines 14-14 of FIG. 12.
Figure 15:
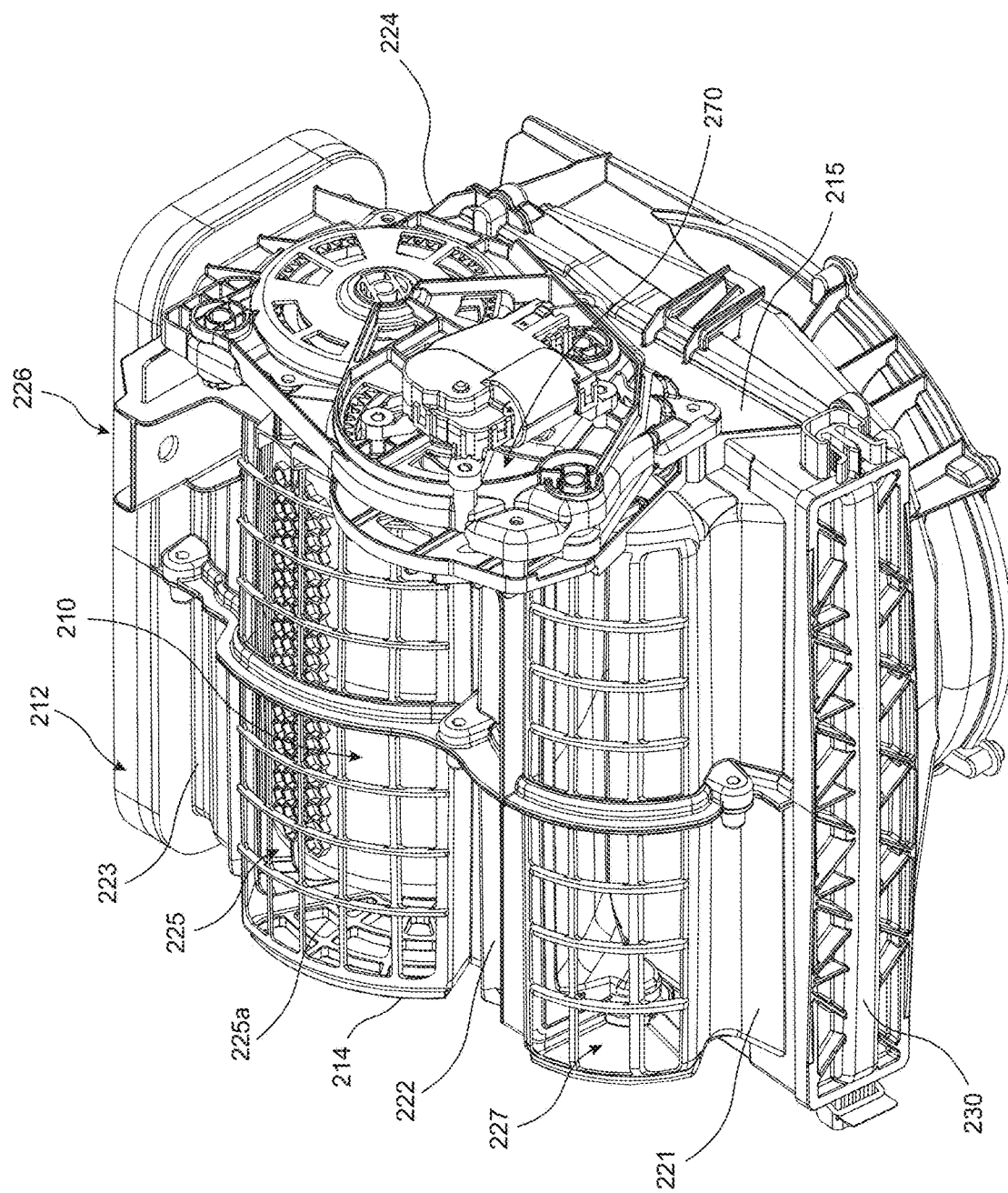
FIG. 15 is a perspective view of an inlet section of a housing of an air handling system for a vehicle according to another embodiment of the present invention.

The baffle door 150 includes an axis of rotation 151 coinciding with the axis of rotation 141 of the air distribution door 140, wherein the axis of rotation 151 may be defined by a shaft, a pair of shaft portions, or similar structures. The baffle door 150 includes a baffle wall 152 including an arcuate portion 153 and a planar portion 154. The arcuate portion 153 includes a substantially constant radius of curvature as measured from the axis of rotation 151 of the baffle door 150. As can be seen in FIG. 8, the radius of curvature of the arcuate portion 153 of the baffle door 150 is slightly less than the radius of curvature of the air directing wall 142, thereby forming a constant gap between the two walls 142, 152 along the arcuate portion 153 of the baffle door 150. The planar portion 154 deviates from the constant radius of curvature of the arcuate portion 153 to project at least slightly in the radially inward direction relative to the tangential direction of the arcuate portion 153 at the intersection of the arcuate portion 153 and the planar portion 154. The inward turning of the planar portion 154 relative to the arcuate portion 153 results in an increasing distance to be formed between the air directing wall 142 and the planar portion 154 as the planar portion 154 extends away from the arcuate portion 153 and towards an end of the baffle wall 152. As shown in FIG. 14, the baffle door 150 further includes a pair of opposing lateral connecting walls 156 indented laterally inwardly of the lateral connecting walls 146 of the air distribution door 156. Additionally, the lateral connecting walls 156 of the baffle door 150 also taper laterally inwardly as the lateral connecting walls 156 extend radially outwardly away from the axis of rotation 151 of the baffle door 150 and may include a slightly arcuate shape.

Figure 10:
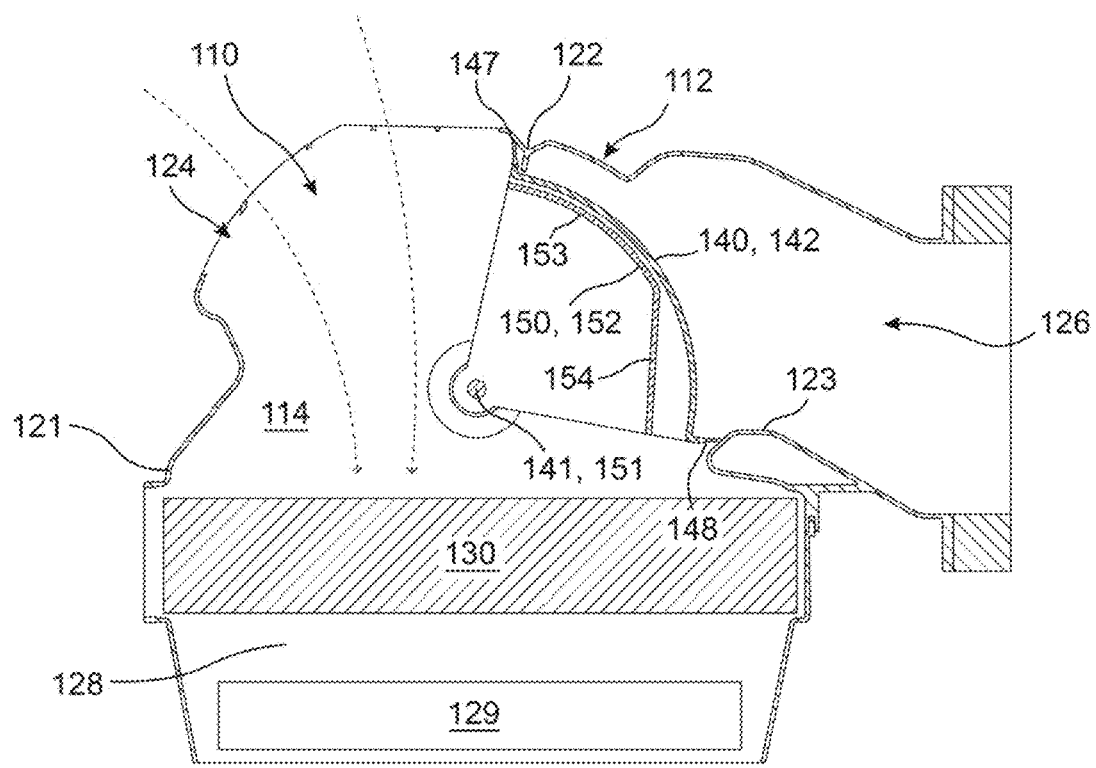
FIG. 10 is a fragmentary cross-sectional elevational view through an inlet section of a housing of an air handling system according to another embodiment of the invention, wherein the air handling system is operating in a recirculation mode of operation.

As shown throughout FIGS. 10-13, the doors 140, 150 can be adjusted to different positions for achieving various different modes of operation of the air handling system. FIG. 10 illustrates a recirculation mode wherein the air distribution door 140 and the baffle door 150 are each pivoted to a position blocking flow from entering through the fresh air inlet 126 with the sealing flaps 147, 148 of the air distribution door 140 sealingly engaging the corresponding surfaces of the housing 112. The positioning of the doors 140, 150 allows for a maximized air flow through the recirculation inlet 124 without providing substantial obstruction to the air flow therethrough.

Figure 11:
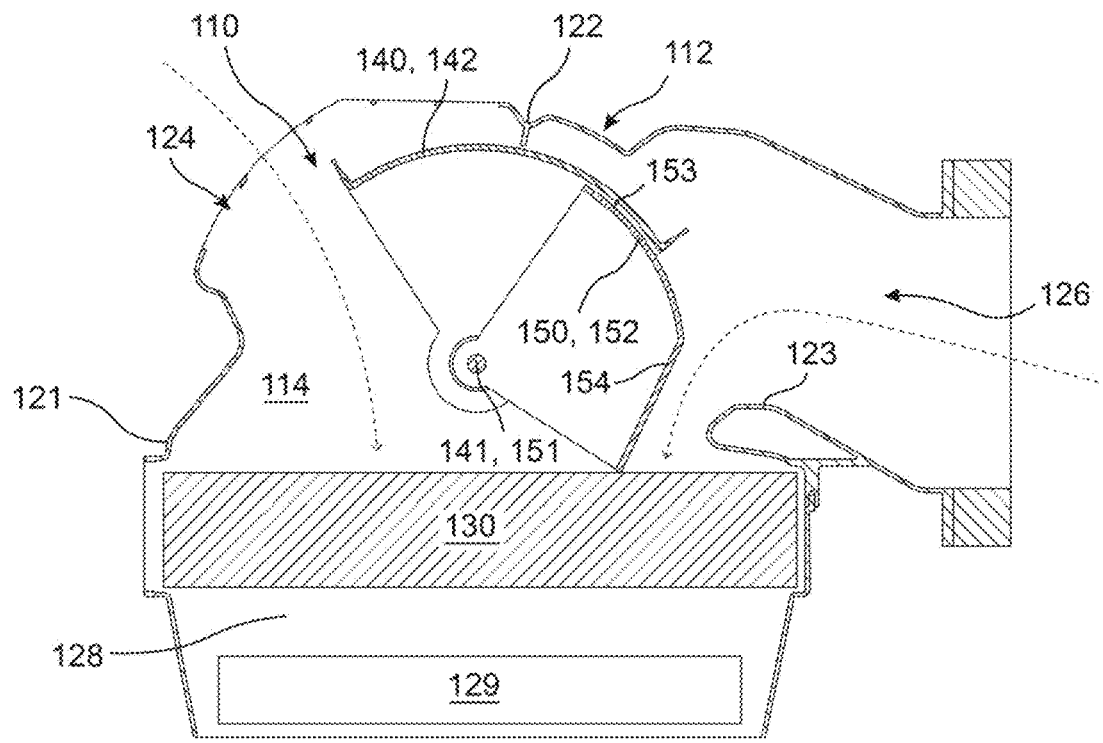
FIG. 11 is a fragmentary cross-sectional elevational view through the inlet section of the housing of FIG. 10, wherein the air handling system is operating in a partial recirculation mode of operation.

FIG. 11 illustrates a partial recirculated air partial fresh air mode (partial recirculation mode) wherein the air distribution door 140 is pivoted to an intermediate position allowing for air to enter the inlet section 10 through each of the recirculation inlet 124 and the fresh air inlet 126. The baffle door 150 is pivoted to a position wherein an end of the planar portion 154 of the baffle wall 152 abuts the air filter 130. The position of the baffle door 150 provides for a reduced flow cross-section into the fresh air inlet 126 for accommodating the increasing ram air pressure while also blocking the flow of the fresh air from back-flowing into the recirculation inlet 124. It should also be apparent that the position of the air distribution door 140 relative to the recirculation inlet 124 and the fresh air inlet 126 may also be adjusted via rotation of the air distribution door 140 in either of the rotational directions for redistributing the percentage of the air originating from the inlets 124, 126 based on considerations such as the desired distribution of the two air flows, the varying ram air pressure experienced by the inlet section 110 as a result of motion of the vehicle, or the humidity of the air being delivered to the passenger compartment.

Figure 12:
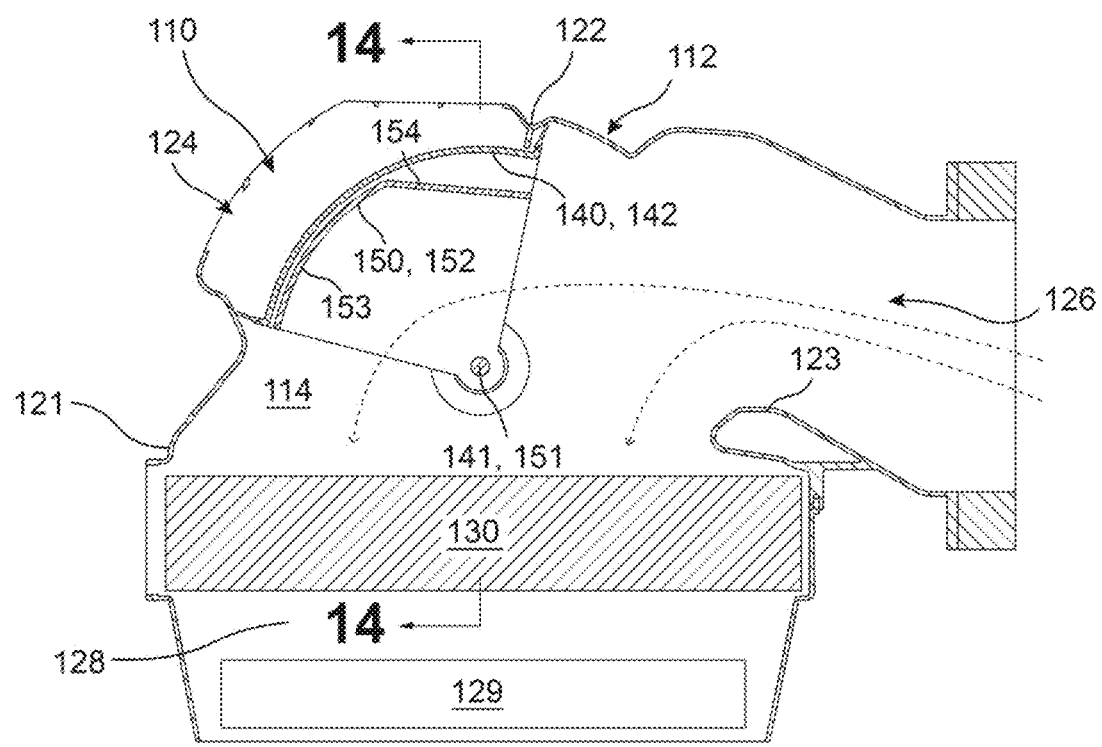
FIG. 12 is a fragmentary cross-sectional elevational view through the inlet section of the housing of FIG. 10, wherein the air handling system is operating in a fresh air mode of operation.

FIG. 12 illustrates a fresh air mode wherein the air distribution door 140 and the baffle door 150 are each pivoted to a position blocking flow from entering through the recirculation inlet 124. The positioning of the doors 140, 150 allows for maximized air flow through the fresh air inlet 126 without providing substantial obstruction to the air flow therethrough.

Figure 13:
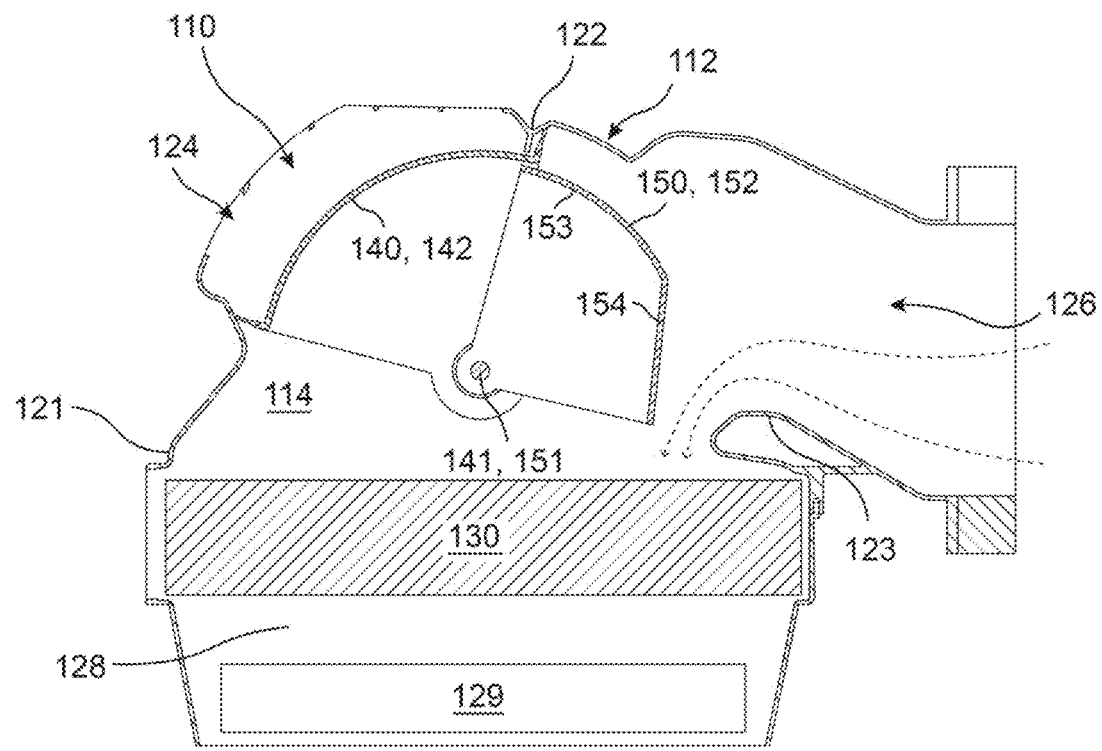
FIG. 13 is a fragmentary cross-sectional elevational view through the inlet section of the housing of FIG. 10, wherein the air handling system is operating in the fresh air mode of operation with a baffle door adjusted to accommodate a ram air pressure of the air passing through a fresh air inlet of the inlet section.

FIG. 13 illustrates a ram air pressure accommodating mode associated with the selection of the fresh air setting by the passenger of the vehicle. The ram air pressure accommodating mode includes the air distribution door 140 pivoted to block flow through the recirculation inlet 124 while the baffle door 150 is pivoted to a position only partially blocking the flow through the fresh air inlet 126 to provide a flow cross-section reduction through the fresh air inlet 126. The reduction in flow cross-section aids in accommodating the ram air pressure that may be occurring due to an increase in speed in the vehicle. It should be apparent from a review of FIG. 13 that a rotation of the baffle door 150 towards the recirculation inlet 124 reduces the flow constriction of the fresh air originating from the fresh air inlet 126, and may occur in reaction to a reduced vehicle speed in comparison to the configuration shown in FIG. 13.

The doors 140, 150 may be controlled by a single kinematic system (not shown) in similar fashion to the doors 40, 50 of the first embodiment. Specifically, the doors 140, 150 may progressively actuate to the positions illustrated in FIGS. 10-13 in that order based on the configuration of the associated kinematics system in similar fashion to that described with reference to the first embodiment illustrated in FIGS. 1-9, and the control logic may also be similar to that employed with regards to the first embodiment. For example, the user may select either of the fresh air setting or the recirculation air setting while the controller adjusts the kinematics system to control the doors 140, 150 to the other illustrated positions in response to changing conditions such as the change in vehicle speed or the utilization of a safety feature for reducing the fogging or icing of the windows of the associated vehicle based on the humidity of the air being ejected into the passenger compartment.

FIGS. 15-24 illustrate an air handling system and the components thereof according to yet another embodiment of the invention. The air handling system includes a housing 212 with an inlet section 210. The housing 212 includes a first wall segment 221, a second wall segment 222, a third wall segment 223, and a fourth wall segment 224. The housing 212 further includes opposing sidewalls 214, 215 connecting the wall segments 221, 222, 223, 224 at lateral sides of the housing 212. A primary recirculation inlet 225 is formed between the second wall segment 222 and the third wall segment 223 while a secondary recirculation inlet 227 is formed between the first wall segment 221 and the second wall segment 222. The primary recirculation inlet 225 and the secondary recirculation inlet 227 are each in fluid communication with the passenger compartment of the vehicle. The primary recirculation inlet 225 may further include a lateral flow opening 225*a* for allowing air to enter the housing 212 in a lateral direction in addition to the flow directions arranged perpendicular to the lateral direction. A fresh air inlet 226 is formed between the third wall segment 223 and the fourth wall segment 224 and is in fluid communication with the ambient air. A blower flow path 228 is formed between the first wall segment 221 and the fourth wall segment 224 and includes an air filter 230 at a position upstream of a blower assembly 229.

A first air distribution door 240 includes an axis of rotation 241 that is substantially equally spaced from each of the second wall segment 222, the third wall segment 223, and the fourth wall segment 224 while disposed upstream of the air filter 230. The first air distribution door 240 includes an air directing wall 242, a pair of lateral connecting walls 246, a first sealing flap 247, and a second sealing flap 248 having substantially similar structure to the analogous components of the air distribution door 140, hence further description is omitted. The first air distribution door 240 is selectively adjustable between a position completely blocking flow through the primary recirculation inlet 225 and a position completely blocking flow through the fresh air inlet 226. The first air distribution door 240 is further adjustable to a plurality of intermediate positions for distributing the incoming air flow between the primary recirculation inlet 225 and the fresh air inlet 226.

A second air distribution door 260 includes an axis of rotation 261 substantially equally spaced from the first wall segment 221 and the second wall segment 222 while also disposed upstream of the air filter 230. The second distribution door 260 includes an air directing wall 262 extending substantially tangential to a circle centred on the axis of rotation 261. A first sealing flap 267 is formed at one end of the air directing wall 262 while a second sealing flap 268 is formed at an opposing end of the air directing wall 262, wherein the sealing flaps 267, 268 have substantially the same configuration as the sealing flaps 47, 48 of the air distribution door 40 for engaging the corresponding wall segments 221, 222 and the corresponding sidewalls 214, 215 in a sealing fashion. The second air distribution door 260 is adjustable between a first position wherein the second air distribution door 260 blocks flow through the secondary recirculation inlet 227 and a second position wherein the second air distribution door 260 extends between the second wall segment 222 and an adjacent surface of the air filter 230. The second air distribution door 260 is further selectively adjustable to intermediate positions between the first position and the second position.

Figure 22:
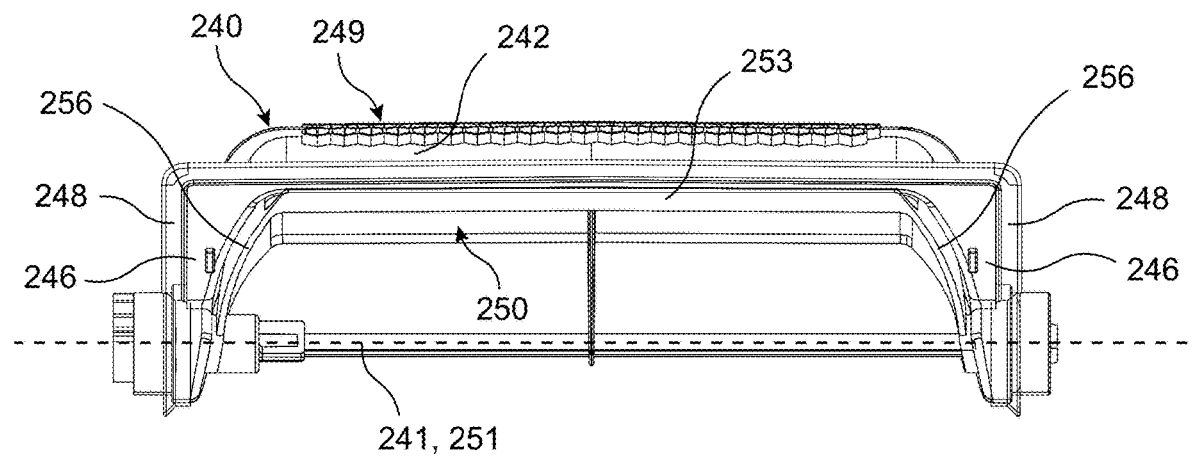
FIG. 22 is a front elevational view of a baffle door and an air distribution door shown in isolation from the remainder of the air handling system.

A baffle door 250 includes an axis of rotation 251 that coincides with the axis of rotation 241 of the first air distribution door 240. The baffle door 250 includes a baffle wall 252 that includes a constant radius of curvature as measured from the axis of rotation 251 of the baffle door 250. An end of the baffle wall 252 biased towards the fourth wall segment 224 includes a radially outwardly extending flange 253 forming a flow diverter positioned between the third wall segment 223 and the fourth wall segment 224. The baffle wall 252 includes a smaller radius of curvature than the first air distribution door 240 to form a radial gap between the doors 240, 250. As shown in FIG. 22, the baffle door 250 further includes an opposing pair of lateral connecting walls 256 connecting the baffle wall 252 to the shaft, shaft portions, or similar shaft structure defining the axis of rotation 251 of the baffle door 250. The lateral connecting walls 256 are tapered laterally inwardly as the lateral connecting walls 256 extend away from the axis of rotation 251 and towards the baffle wall 252 and may further include a slightly arcuate shape.

The first and second air distribution doors 240, 260 may each be swing/barrel type doors having low sensitivity to leaks and deformation caused by the pressure differentials generated within the inlet section 210. The baffle door 250 is also provided to not include sealing elements about the peripheral surfaces thereof, hence the baffle door 250 acts to block the flow of air without providing a fluid tight seal around the outer edges thereof. Additionally, the laterally inward tapering of the lateral connecting walls 256 relative to the corresponding lateral connecting walls 246 of the first air distribution door 240 allows for a small gap to be formed around the baffle door 250 when rotationally offset from the first air distribution door 240 to prevent a total blockage of the fresh air inlet 226 even when the baffle door 250 is adjusted to a position extending between the third and fourth wall segments 223, 224. The gap formed around the periphery of the baffle door 250 may be selectively tuned in accordance with the expected operation conditions faced by the inlet section 210 in order to reduce an incidence of NVH for air entering the inlet section 210 through the fresh air inlet 226 and passing around the baffle door 250 when in a flow obstructing position.

The doors 240, 250, 260 located within the inlet section 210 can be adjusted to a plurality of different rotational positions to achieve a plurality of different modes of operation of the air handling system. The air filter 230 is provided without a dedicated sealing surface or structure for engaging the sealing flaps of the associated air distribution doors 240, 260. An inlet tray forming a portion of the blower assembly 229 can also be provided without the need for lower bellmouth walls, as desired, to prescribe a desired flow configuration of the air after having passed through the air filter 230.

Figure 16:
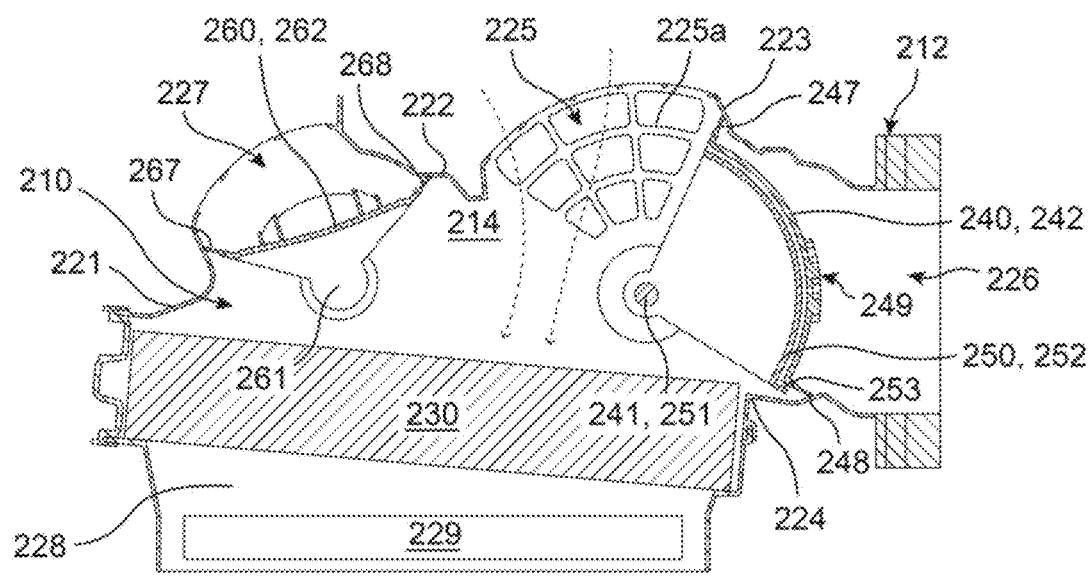
FIG. 16 is a fragmentary cross-sectional elevational view through an inlet section of a housing of FIG. 15, wherein the air handling system is operating in a recirculation mode of operation.

FIG. 16 illustrates one potential recirculation mode of the air handling system wherein the first air distribution door 240 and the baffle door 250 are each pivoted away from the primary recirculation inlet 225 to block flow from entering through the fresh air inlet 226 while the second air distribution door 260 is pivoted to block flow through the secondary recirculation inlet 227. The entirety of the flow of the recirculated air enters through the primary recirculation inlet 225 while the doors 240, 250, 260 are pivoted to positions allowing for a minimized flow obstruction of the entering recirculated air.

Figure 17:
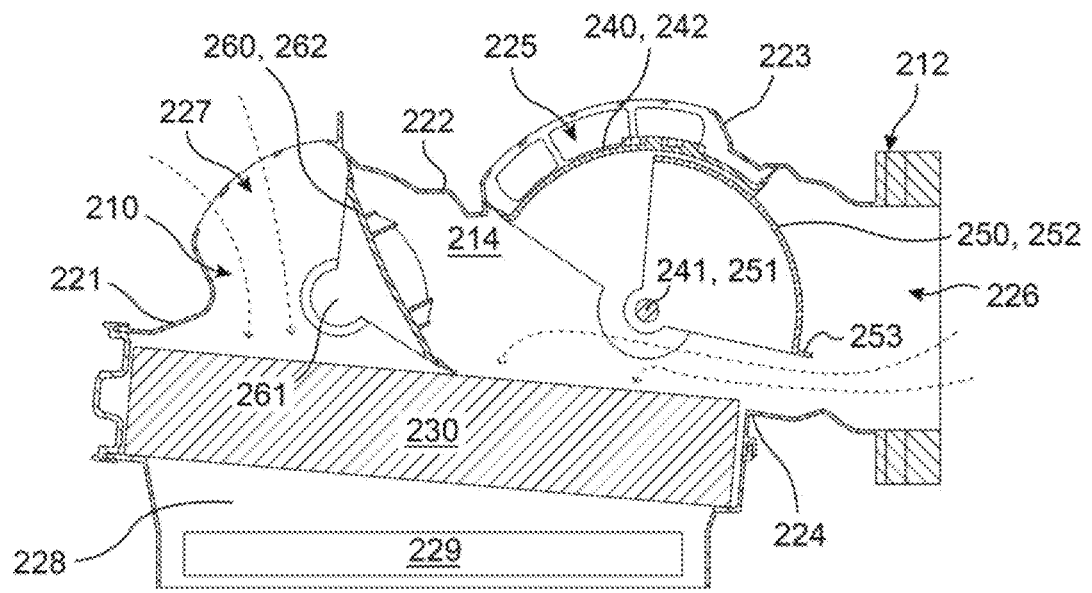
FIG. 17 is a fragmentary cross-sectional elevational view through an inlet section of a housing of FIG. 15, wherein the air handling system is operating in a partial recirculation mode of operation with a baffle door adjusted to a first position to accommodate a ram air pressure of the air passing through a fresh air inlet of the inlet section.
Figure 18:
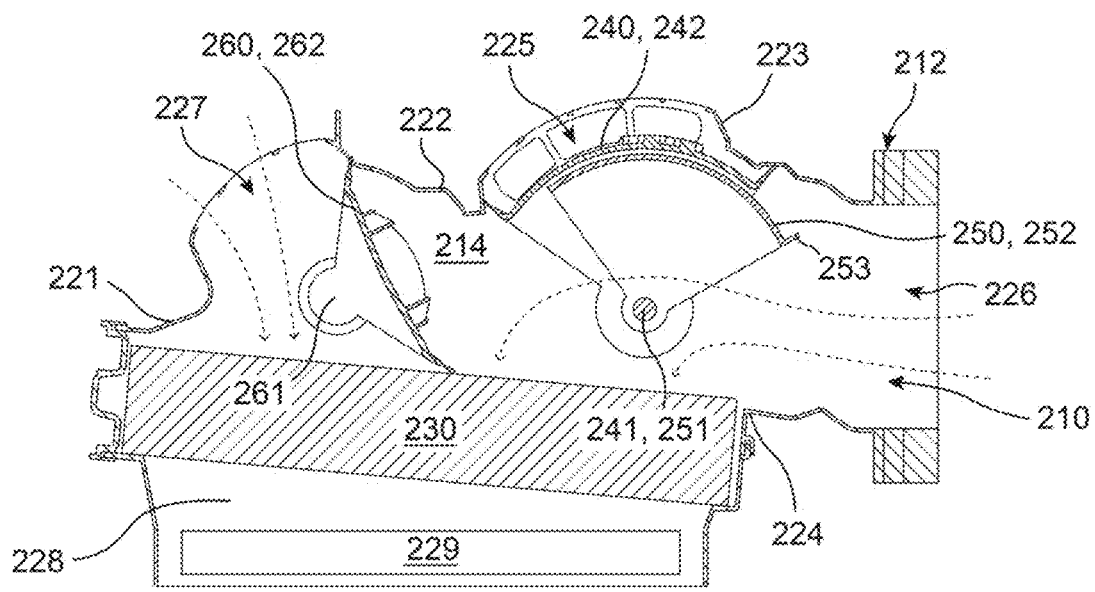
FIG. 18 is a fragmentary cross-sectional elevational view through an inlet section of a housing of FIG. 15, wherein the air handling system is operating in a partial recirculation mode of operation with the baffle door adjusted to a second position to accommodate a ram air pressure of the air passing through a fresh air inlet of the inlet section.

FIGS. 17 and 18 show the inlet section 210 when in two different partial fresh air partial recirculated air (partial recirculation) operating modes. The second air distribution door 260 is pivoted to a position opening the secondary recirculation inlet 227 while also abutting a face of the air filter 230. The first air distribution door 240 is pivoted to block flow from entering through the primary recirculation inlet 225 while allowing for flow to enter through the fresh air inlet 226. FIG. 17 illustrates the baffle door 250 at a rotational position for providing an increased flow obstruction of the fresh air entering through the fresh air inlet 226 as would be consistent with a relatively high ram air pressure which corresponds to a relatively high vehicle speed. In contrast, FIG. 18 illustrates the baffle door 250 at a rotational position for providing a reduced flow obstruction of the fresh air entering through the fresh air inlet 226 as would be consistent with a relatively low ram air pressure which corresponds to a relatively low vehicle speed. The baffle door 250 can be adjusted to a plurality of different rotational positions between the two illustrated in FIGS. 17 and 18 in order to control the distribution of the air originating from the secondary recirculation inlet 227 and the fresh air inlet 226 or for accommodating the variable ram air pressures encountered by the vehicle during movement thereof in similar fashion to the previous embodiments of the present invention. The distribution of the air entering through the secondary recirculation inlet 227 and the fresh air inlet 226 may also be controlled to alter the humidity of the air entering the passenger compartment, as desired.

The manner in which the second air distribution door 260 extends between the second wall segment 222 and the air filter 230 also prevents the fresh air from flowing past the second air distribution door 260 and towards the secondary recirculation inlet 227, thereby preventing an incidence of the back-flowing of the fresh air into the passenger compartment through the secondary recirculation inlet 227.

Figure 19:
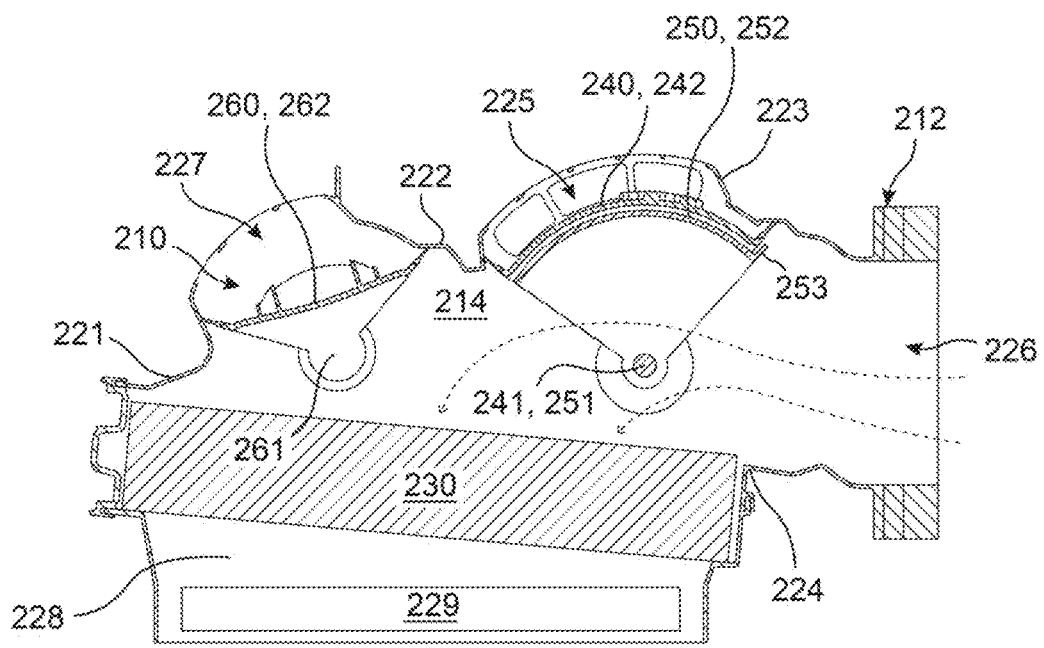
FIG. 19 is a fragmentary cross-sectional elevational view through the inlet section of the housing of FIG. 15, wherein the air handling system is operating in a fresh air mode of operation.

FIG. 19 illustrates a fresh air mode of the inlet section 210 wherein the first air distribution door 240 is pivoted to block flow through the primary recirculation inlet 225 while the second air distribution door 260 is pivoted to block flow through the secondary recirculation inlet 227. The baffle door 250 is also pivoted away from the fresh air inlet 226 to provide for a maximized flow cross-section through the fresh air inlet 226 without any of the doors 240, 250, 260 obstructing the flow of the air entering through the fresh air inlet 226.

Figure 20:
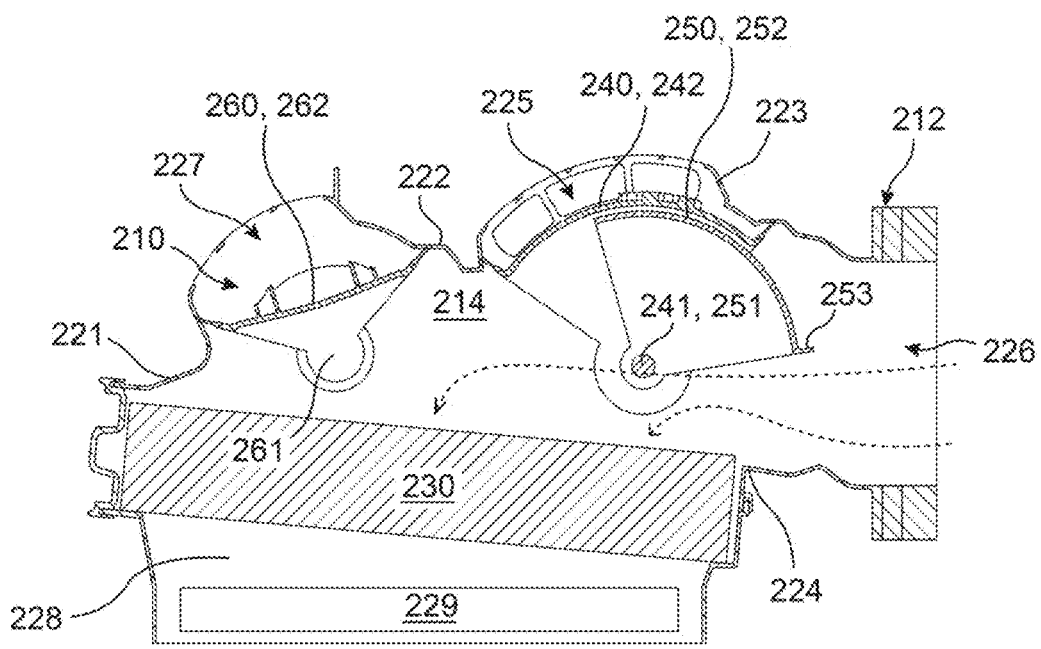
FIG. 20 is a fragmentary cross-sectional elevational view through the inlet section of the housing of FIG. 15, wherein the air handling system is operating in the fresh air mode of operation with a baffle door adjusted to a first position to accommodate a ram air pressure of the air passing through a fresh air inlet of the inlet section.
Figure 21:
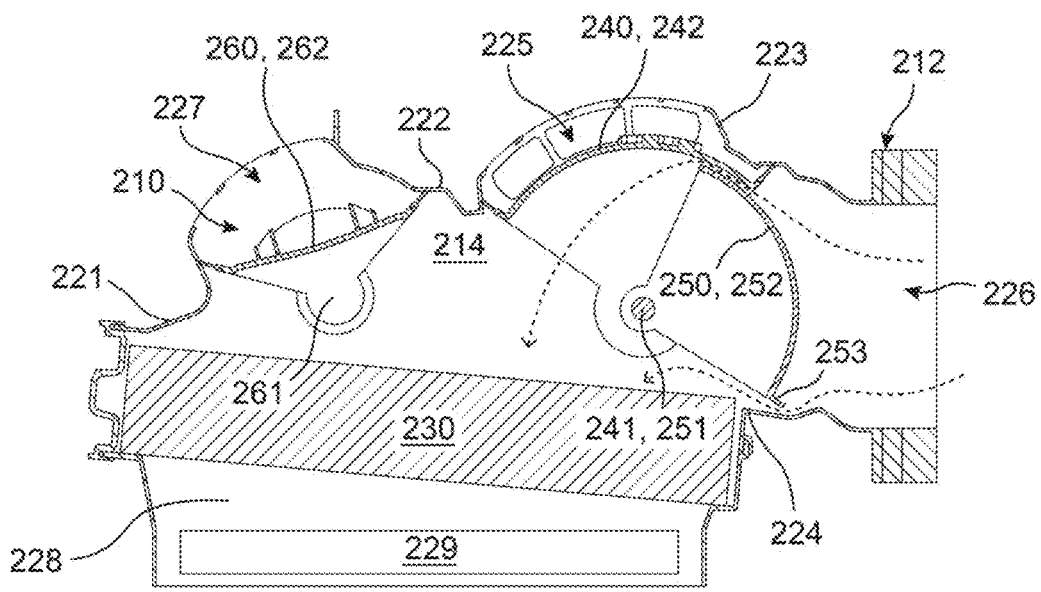
FIG. 21 is a fragmentary cross-sectional elevational view through the inlet section of the housing of FIG. 15, wherein the air handling system is operating in the fresh air mode of operation with the baffle door adjusted to a second position to accommodate a ram air pressure of the air passing through a fresh air inlet of the inlet section.

FIGS. 20 and 21 illustrate the baffle door 250 when accommodating varying ram air pressures experienced by the fresh air inlet 226 as a result of varying speeds of the vehicle when the fresh air setting is otherwise selected by the passenger of the vehicle. FIG. 20 illustrates the baffle door 250 as rotated towards the fourth wall segment 224 to an extent for partially obstructing the fresh air inlet 226 as would be consistent with a ram air pressure associated with a relatively slow speed of the vehicle. In contrast, FIG. 21 illustrates the baffle door 250 in a maximum flow obstructing position wherein the flange 253 of the baffle door 250 is disposed immediately adjacent the fourth wall segment 224 to form a relatively small gap therebetween. The configuration in FIG. 21 may obstruct the flow between the flange 253 and the fourth wall segment 224 to the extent that at least a portion of the air originating from the fresh air inlet 226 tends to flow through the radial gap established between the first air distribution door 240 and the baffle door 250 as well as flowing through any lateral gaps established by the laterally inwardly tapering configuration of the lateral connecting walls 256 of the baffle door 250 in comparison to the adjacent sidewalls 214, 215 of the housing 212. This maximum flow obstruction position of the baffle door 250 may be associated with an extremely high vehicle speed corresponding to an extremely high ram air pressure or may be utilized in an attempt to substantially close off entry into the inlet section 210 when the vehicle is not in operation, such as to prevent debris or animals such as small rodents or birds from incidentally entering into the inlet section 210. The baffle door 250 is of course also adjustable to any number of positions in addition to those illustrated for accommodating any number of ram air pressures experienced within the inlet section 210 via the fresh air inlet 226.

Figure 23:
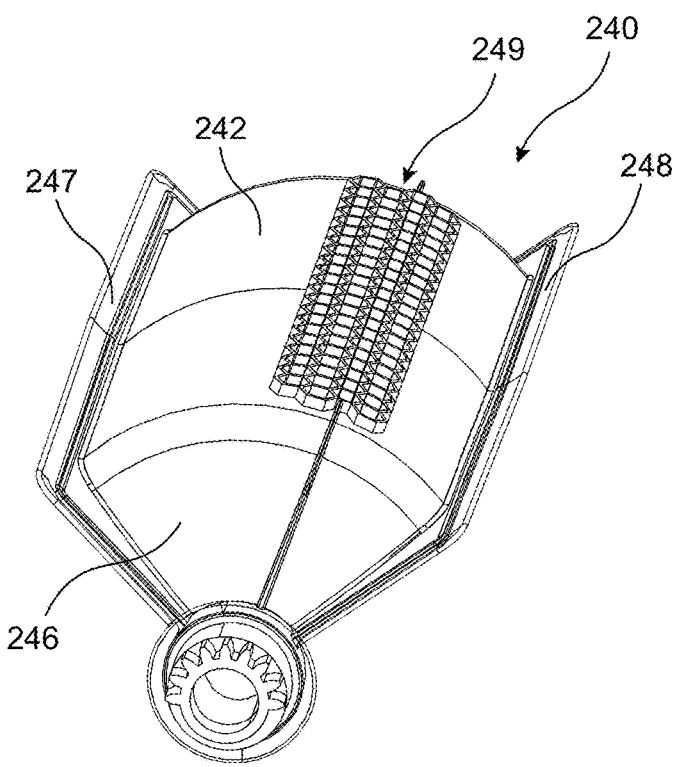
FIG. 23 is a perspective view of the air distribution door of FIG. 22 shown in isolation from the remainder of the air handling system.

As shown in FIG. 23, the first air distribution door 240 may further include a sound reduction feature 249 is similar fashion to the sound reduction feature 5 of the air distribution door 40 of the first embodiment. The sound reduction feature 249 is formed directly on the radially outward surface of the air directing wall 242 of the first air distribution door 240 and is configured to prevent the generation of NVH when a flow of the air originating from the fresh air inlet 226 is caused to flow around the radial outer surface of the air directing wall 242 towards the primary recirculation inlet 225 as may occur during certain configurations of the doors 240, 250. The sound reduction feature 249 is once again a honeycomb pattern of openings extending radially inwardly into the outer surface of the air directing wall 242 for disturbing the vortex shedding of the air passing thereover and for preventing other sound related incidences such as whistling or the like. The sound reduction feature 249 is elongated in the circumferential direction of the air directing wall 242 in comparison to the sound reduction feature 5 of the air distribution door 40 and in turn is opposed by an elongated indented surface of the third wall segment 223 having substantially the same curvature as the outer surface of the air directing wall 242. The elongation of the corresponding surfaces leads to a reduced air flow therebetween and also further prevents the formation of NVH in comparison to a relatively shorter length of the interaction between the opposing surfaces.

Figure 24:
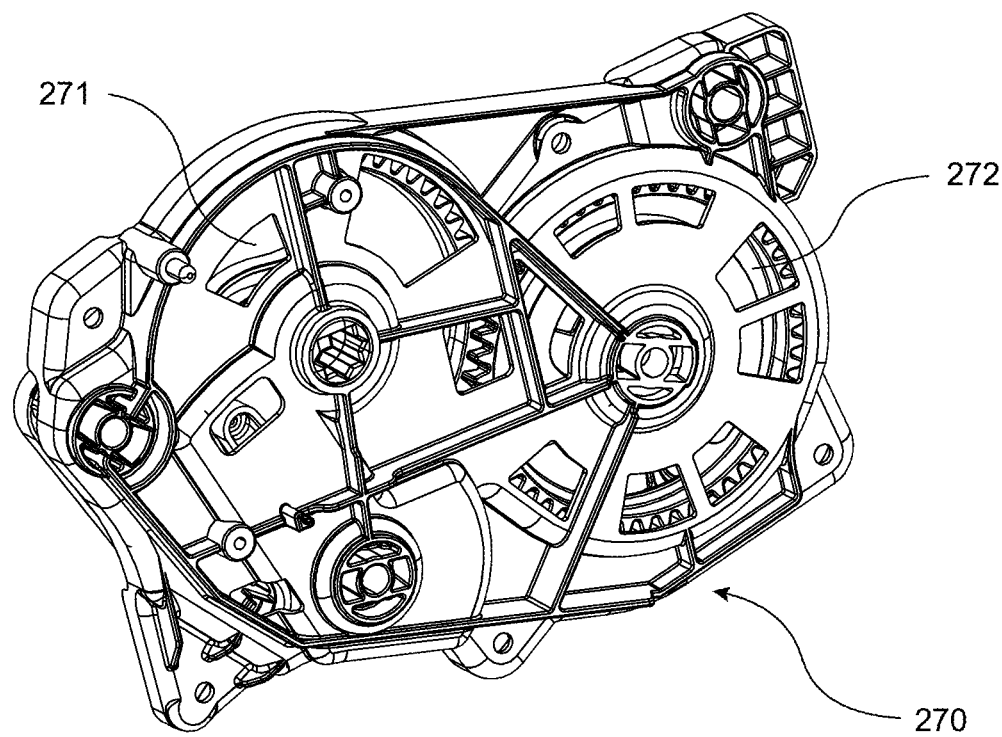
FIG. 24 is a perspective view of a kinematics system suitable for controlling the positions of doors disposed within the inlet section of the housing in accordance with the modes of operation of the air handling system disclosed in FIGS. 16-21.

FIG. 24 partially illustrates a suitable kinematics system 270 for controlling all three of the doors 240, 250, 260 disclosed in the third embodiment of the air handling system simultaneously to each of the different configurations illustrated throughout FIGS. 16-21. The kinematics system 270 is substantially similar to the kinematics system 70 in several respects and includes a first cam plate 271 having a circular shape with outwardly projecting gear teeth as well as a second cam plate 272 having a circular shape with outwardly projecting gear teeth configured to engage the gear teeth of the first cam plate, wherein rotation of either of the cam plates 271, 272 causes a corresponding rotation of the other of the cam plates 271, 272 via the use of single actuator operationally engaged to either of the cam plates 271, 272. One of the cam plates 272 further includes a cam track on each side thereof in similar fashion to the cam plate 71 of the kinematics system 70 wherein each of the cam tracks is responsible for rotation of one of the three doors 240, 250, 260 via a suitable operationally engaging link. The other of the cam plates 271, 272 includes only a single cam track and corresponding link for controlling the third of the doors 240, 250, 260 not operationally engaged with the cam plate 271, 272 having the two cam tracks. However, it should be understood that the kinematics system 270 may include any variety of different components having the desired kinematic relationships for simultaneously controlling the rotational position of all three of the doors 240, 250, 260 using a single actuator while remaining within the scope of the present invention.

Figure 25:
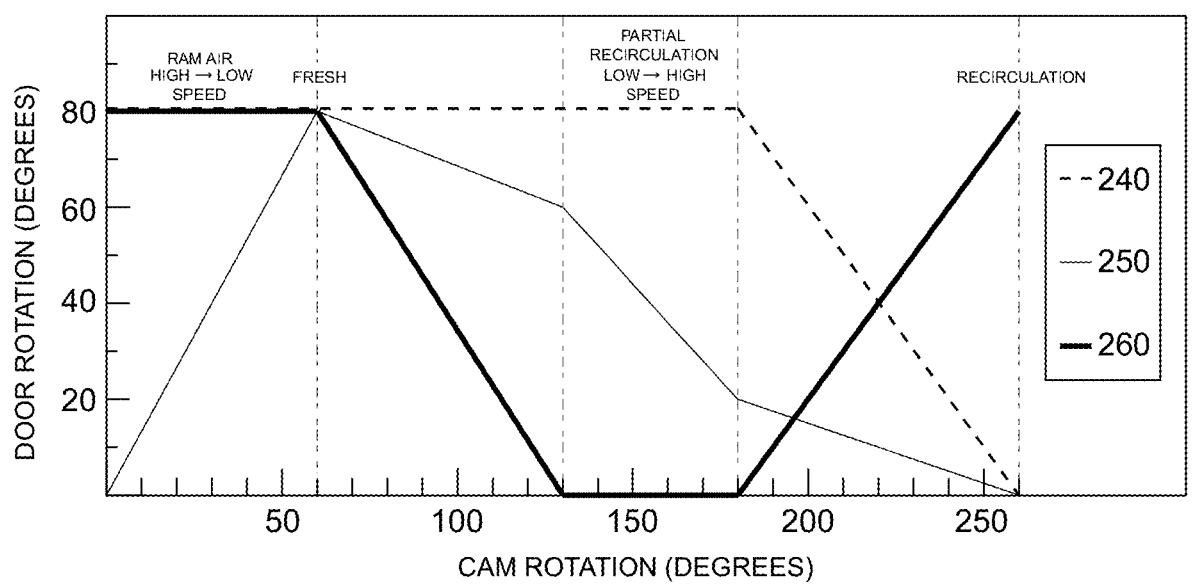
FIG. 25 is a chart showing a kinematic relationship between the kinematic system of FIG. 24 and each of the doors disposed within the inlet section of the housing in accordance with the modes of operation of the air handling system disclosed in FIGS. 16-21.

FIG. 25 illustrates a chart for describing the kinematic relationship utilized for simultaneously controlling each of the doors 240, 250, 260 illustrated throughout FIGS. 16-21. The x-axis of the chart referring to the cam rotation may refer to the rotational position of either of the cam plates 271, 272 illustrated in FIG. 24 between the two opposing end positions thereof due to the manner in which the rotation of one of the cam plates 271, 272 directly corresponds to the rotation of the other of the cam plates 271, 272. As indicated by the chart, the cam plates 271, 272 are configured to rotate through about 260 degrees of rotation in order to adjust the doors 240, 250, 260 through a full range of possible rotational positions as indicated throughout FIGS. 16-21. Specifically, it is noted in the chart that one end point of the rotation of the cam plates 271, 272 indicated by the 260 degree position is associated with the pure recirculation mode of the operation disclosed in FIG. 16 while the opposing end point of the rotation of the cam plates 271, 272 indicated by the 0 degree position is associated with the ram air pressure accommodating mode of operation associated with the fresh air setting when a maximized ram air pressure is experienced by the fresh air inlet 226 in response to the vehicle traveling at a maximum speed as illustrated in FIG. 21. It is further apparent that progressing from the 260 degree position towards the 0 degree position causes the doors 240, 250, 260 to progress in order through the different configurations shown throughout FIGS. 16-21, in that order. The y-axis of the chart indicates that each of the associated doors 240, 250, 260 rotates through about 80 degrees of rotation when adjusted between the end rotational positions thereof used for achieving each of the described modes of operation.

As explained previously with regards to the previously disclosed embodiments, the passenger of the vehicle may be allowed to select either the fresh air setting or the recirculation air setting for achieving either of the configurations of the doors 240, 250, 260 disclosed herein. In some circumstances, the passenger may also be allowed to select the partial recirculation mode of operation, as desired. However, upon the selection of a general mode of operation, the controller of the air handling system responsible for actuation of the doors 240, 250, 260 may be configured to monitor aspects of the vehicle such as the vehicle speed, the humidity of the air entering or disposed within the passenger compartment of the vehicle, or the actual pressure of the air flowing through any of the flow paths formed by the air handling system in order to adjust the doors 240, 250, 260 to any of the variable modes of operation associated with the ram air compensation mode of operation associated with the fresh air setting or the partial recirculation modes of operation between the fresh air setting and the recirculation setting.

It should also be understood that the disclosed kinematics system 270 responsible for controlling the rotational position of all three of the doors 240, 250, 260 via a single actuator may be replaced with multiple independent kinematic systems or multiple different actuators while remaining within the general scope of the present invention. For example, one kinematics system actuated by a first actuator may be responsible for the rotation of any two of the doors 240, 250, 260 while an independently provided second actuator may be responsible for the rotation of the remaining third one of the doors 240, 250, 260. Alternatively still, each of the doors 240, 250, 260 may be actuated by its own independently controlled actuator, as desired. Such independent control of each of the doors 240, 250, 260 may beneficially allow for a greater variety of the desired modes of operation of the air handling system and may further facilitate adjustment to these different modes of operation more quickly than the use of a single kinematics system that must proceed through a predefined set of operational modes before reaching the newly selected operational mode.

Figure 26:
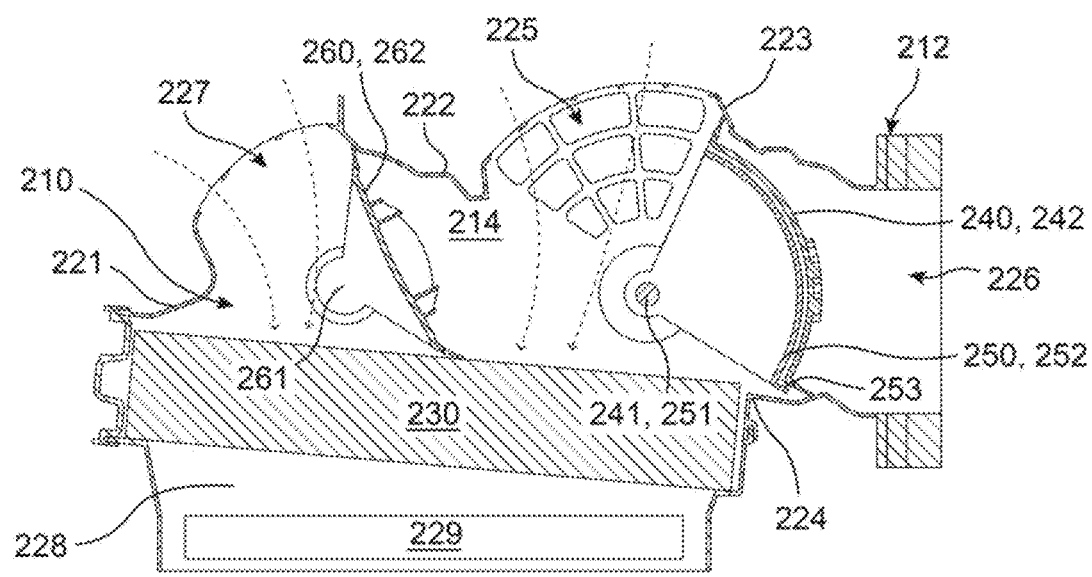
FIG. 26 is a fragmentary cross-sectional elevational view through an inlet section of a housing of FIG. 15, wherein the air handling system is operating in an alternative recirculation mode of operation to that shown in FIG. 16.
Figure 27:
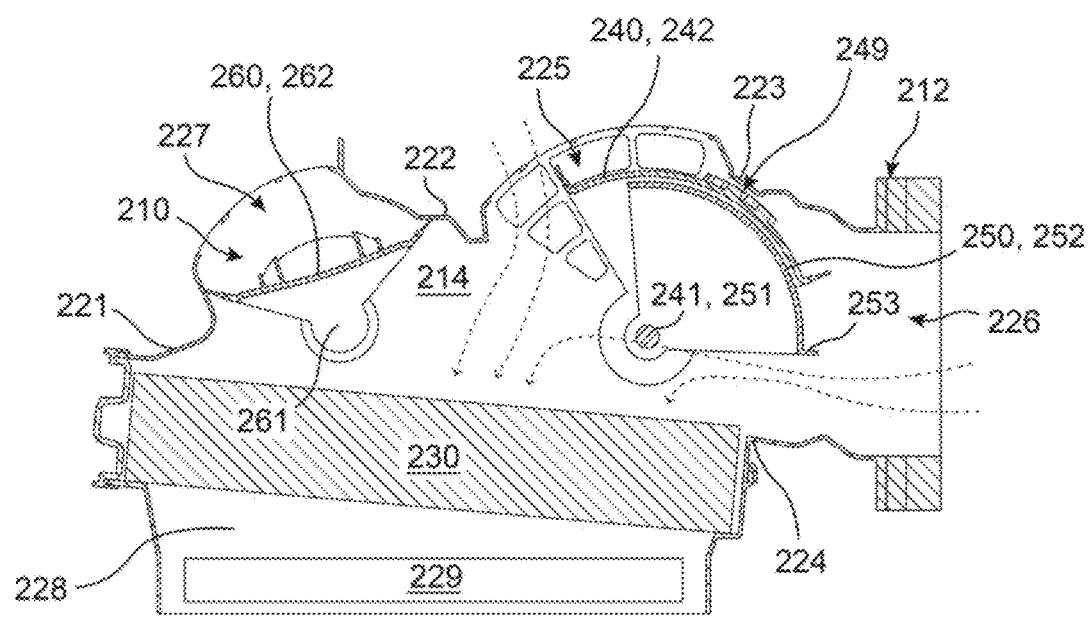
FIG. 27 is a fragmentary cross-sectional elevational view through an inlet section of a housing of FIG. 15, wherein the air handling system is operating in an alternative partial recirculation mode of operation to those shown in FIGS. 17 and 18.

Lastly, FIGS. 26 and 27 illustrate that the doors 240, 250, 260 disposed within the inlet section 210 are also able to be adjusted to positions additional to those shown and described previously in FIGS. 16-21 for achieving the same distribution of fresh and recirculated air within the inlet section 210 while varying which of the inlets 225, 226, 227 provides the different air flows entering the inlet section. These variations may be useful when it is discovered that the NVH or other characteristics of the system are optimized when the air follows specific paths through the housing 212, as determined by experimentation. The different positions may also facilitate increased air flow or better directional control in some circumstances. The different rotational positions needed for achieving these alternative modes may be acquired by adjusting the kinematics of the associated kinematic system used to control the positions of the doors 240, 250, 260, or may be associated with providing independently controlled actuators or additional kinematics systems as contemplated hereinabove.

For example, FIG. 26 illustrates a maximized recirculation mode of operation of the air handling system wherein each of the primary recirculation inlet 225 and the secondary recirculation inlet 227 are fully opened to allow for a maximized flow of the recirculated air into the inlet section 210. FIG. 27 in turn illustrates an alternative partial recirculation mode of operation wherein the recirculated air enters through the primary recirculation inlet 225 and the fresh air enters through the fresh air inlet 226. The first air distribution door 240 and the baffle door 250 may each be rotated in either rotational direction from the configuration illustrated to further control the distribution of the air originating from each inlet 225, 226 while also attempting to accommodate the varying ram air pressure experienced by the air entering through the fresh air inlet 226.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air handling system of a vehicle comprising:
a housing defining an inlet section, the inlet section including a first recirculation inlet configured to receive recirculated air originating from a passenger compartment of the vehicle and a fresh air inlet configured to receive fresh air originating from an ambient environment;
a first air distribution door disposed in the inlet section and configured to control a distribution of the recirculated air and the fresh air entering the inlet section through the first recirculation inlet and the fresh air inlet; and
a baffle door disposed in the inlet section and configured to selectively reduce a flow area through the fresh air inlet to accommodate a ram air pressure induced by motion of the vehicle relative to the fresh air of the ambient environment wherein the housing further defines a blower flow path disposed downstream of the first air distribution door and the baffle door with respect to a flow of the recirculated air and a flow of the fresh air, wherein the blower flow path leads to a blower of the air handling system, and wherein the blower flow path includes an air filter disposed upstream of the blower, and wherein at least one of the baffle door or the first air distribution door is configured to be positioned to contact a surface of the air filter.

2. The air handling system of claim 1, wherein an axis of rotation of the first air distribution door is spaced apart from an axis of rotation of the baffle door.

3. The air handling system of claim 2, wherein the baffle door is configured to be adjustable to a position arranged parallel to the first air distribution door to allow for a maximized flow of air to pass between the baffle door and the first air distribution door.

4. The air handling system of claim 2, wherein the baffle door is configured to be adjustable to a position arranged perpendicular to the first air distribution door to allow for a minimized flow of air to pass between the baffle door and the first air distribution door.

5. The air handling system of claim 1, wherein the first air distribution door and the baffle door include a common axis of rotation.

6. The air handling system of claim 5, wherein the first air distribution door includes an air directing wall and the baffle door includes a baffle wall, wherein the baffle wall is disposed radially inwardly of the first air directing wall relative to the common axis of rotation.

7. The air handling system of claim 1, wherein the first air distribution door includes a sealing element for sealing against a surface of the housing while the baffle door is devoid of a sealing element for sealing against a surface of the housing.

8. The air handling system of claim 1, wherein the baffle door is dimensioned to be configured to nest within the first air distribution door with respect to at least one position of the baffle door.

9. The air handling system of claim 1, wherein the baffle door is dimensioned to always allow for air to flow around the baffle door when the first air distribution door is positioned to allow for air to flow through the fresh air inlet.

10. The air handling system of claim 1, wherein the air handling system is configured for operation in a fresh air mode, wherein the fresh air mode includes the first air distribution door blocking a flow of the recirculated air from passing through the first recirculation inlet, wherein the baffle door is configured to progressively reduce the flow area through the fresh air inlet to accommodate the ram air pressure increasing in response to an increasing speed of the vehicle.

11. The air handling system of claim 1, wherein the air handling system is configured for operation is a partial recirculation mode, wherein the partial recirculation mode includes the first air distribution door positioned in an intermediate position for allowing a flow of the recirculated air through the first recirculation inlet and a flow of the fresh air through the fresh air inlet, wherein the baffle door is configured to progressively reduce the flow area through the fresh air inlet to accommodate the ram air pressure increasing in response to an increasing speed of the vehicle.

12. The air handling system of claim 1, wherein the first air distribution door includes a sound suppression feature configured to reduce the noise, vibration, and harshness of air passing between the sound suppression feature and a surface of the housing.

13. An air handling system of a vehicle comprising:
a housing defining an inlet section, the inlet section including a first recirculation inlet configured to receive recirculated air originating from a passenger compartment of the vehicle and a fresh air inlet configured to receive fresh air originating from an ambient environment;
a first air distribution door disposed in the inlet section and configured to control a distribution of the recirculated air and the fresh air entering the inlet section through the first recirculation inlet and the fresh air inlet; and
a baffle door disposed in the inlet section and configured to selectively reduce a flow area through the fresh air inlet to accommodate a ram air pressure induced by motion of the vehicle relative to the fresh air of the ambient environment, wherein the inlet section further includes a second recirculation inlet configured to receive the recirculated air originating from the passenger compartment of the vehicle.

14. The air handling system of claim 13, wherein a second air distribution door is configured to selectively open or close the second recirculation inlet.

15. The air handling system of claim 14, wherein the first air distribution door and the baffle door include a common axis of rotation spaced apart from an axis of rotation of the second air distribution door.

16. The air handling system of claim 14, wherein the second air distribution door is configured to be positioned to contact an air filter disposed within the inlet section of the housing.

* * * * *